US007242395B2

(12) United States Patent
Kurashima et al.

(10) Patent No.: US 7,242,395 B2
(45) Date of Patent: Jul. 10, 2007

(54) INPUT DEVICE AND DRIVING DEVICE THEREOF

(75) Inventors: Shigemi Kurashima, Shinagawa (JP); Nobuyoshi Shimizu, Shinagawa (JP); Akio Nakamura, Shinagawa (JP); Yuriko Nishiyama, Shinagawa (JP); Shinichiro Akieda, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 670 days.

(21) Appl. No.: 10/677,236

(22) Filed: Oct. 3, 2003

(65) Prior Publication Data
US 2004/0178996 A1    Sep. 16, 2004

(30) Foreign Application Priority Data
Mar. 10, 2003    (JP)    ............................. 2003-063844

(51) Int. Cl.
G09G 5/00    (2006.01)
G06K 11/06    (2006.01)

(52) U.S. Cl. .................. 345/173; 178/18.01; 178/18.03

(58) Field of Classification Search .. 178/18.01–18.08; 345/173–184
See application file for complete search history.

(56) References Cited

U.S. PATENT DOCUMENTS 5,997,867 A * 12/1999 Waldmann et al. ...... 424/154.1

| 6,400,359 | B1 * | 6/2002 | Katabami ................... 345/173 |
| 6,429,846 | B2 * | 8/2002 | Rosenberg et al. ......... 345/156 |
| 2003/0058265 | A1 * | 3/2003 | Robinson et al. ........... 345/701 |
| 2003/0067449 | A1 * | 4/2003 | Yoshikawa et al. ......... 345/173 |
| 2003/0179190 | A1 * | 9/2003 | Franzen ...................... 345/173 |
| 2003/0184574 | A1 * | 10/2003 | Phillips et al. .............. 345/702 |

FOREIGN PATENT DOCUMENTS

| JP | 11-85400 | 3/1999 |
| JP | 3085481 | 2/2002 |
| WO | 00/78095 A1 | 12/2000 |

* cited by examiner

*Primary Examiner*—Richard Hjerpe
*Assistant Examiner*—M. Fatahiyar
(74) *Attorney, Agent, or Firm*—Staas & Halsey LLP

(57) ABSTRACT

An input device and a driving device able to be made thin and secure sufficiently large vibration amplitude are provided. The input device comprises an input panel, a current conducting element for conducting a driving current, and a magnetic field application unit for applying a magnetic field on the current conducting element. Both of the current conducting element and the magnetic field application unit are arranged in the peripheral region of the input panel. The magnetic field applied by the magnetic field application unit is parallel to the input panel and intersects the current conducting element. When the input panel is touched, a driving current is fed into the current conducting element, and a force is imposed on the current conducting element and the magnetic field application unit, making them move. This movement further drives the input panel to vibrate. Consequently, input operations can be recognized by feeling the vibration of the input panel.

25 Claims, 26 Drawing Sheets

FIG.3
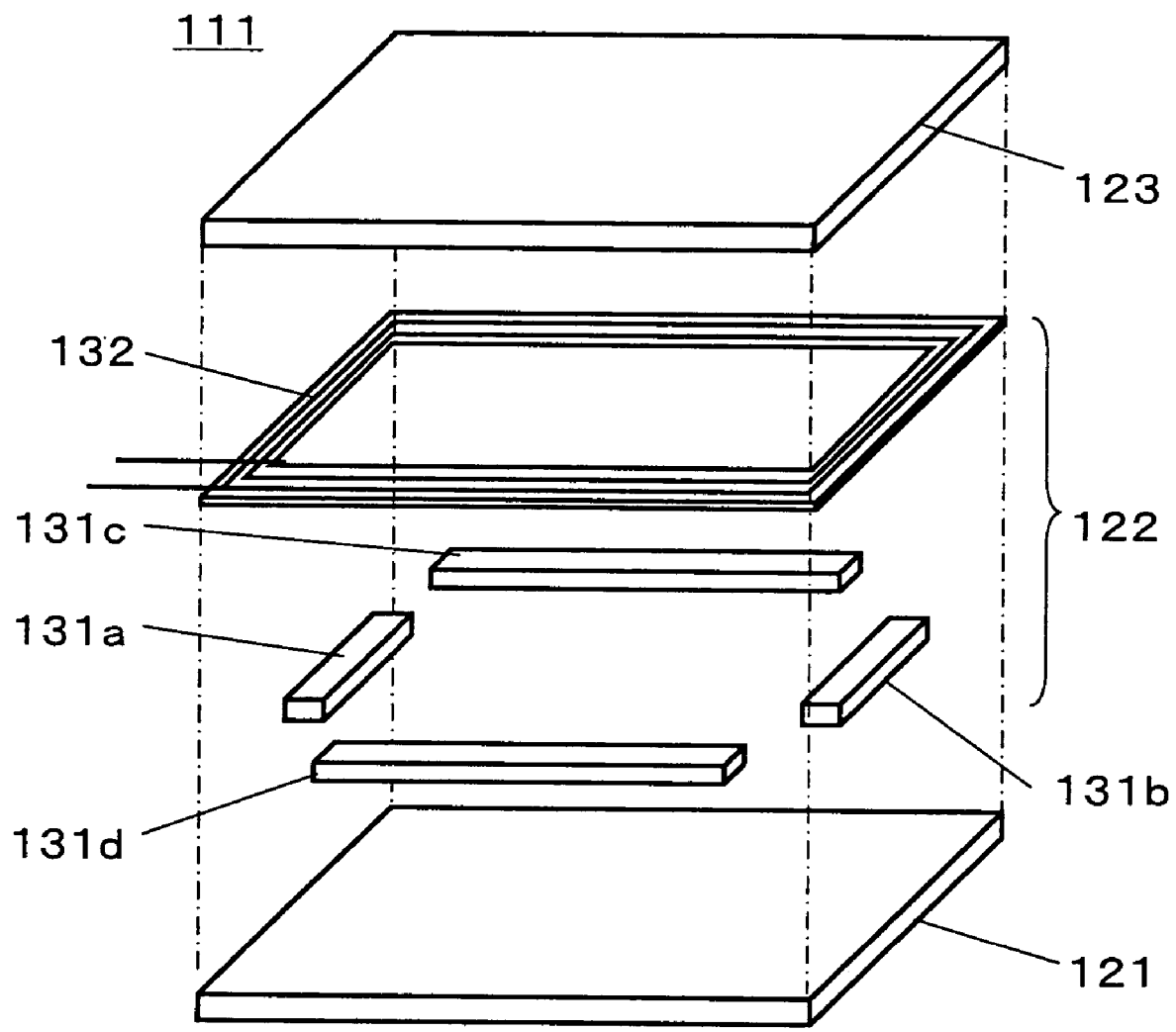
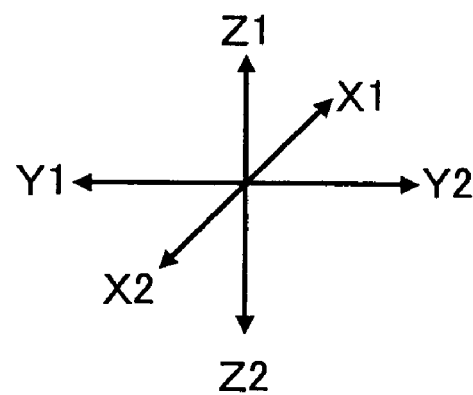

FIG.6
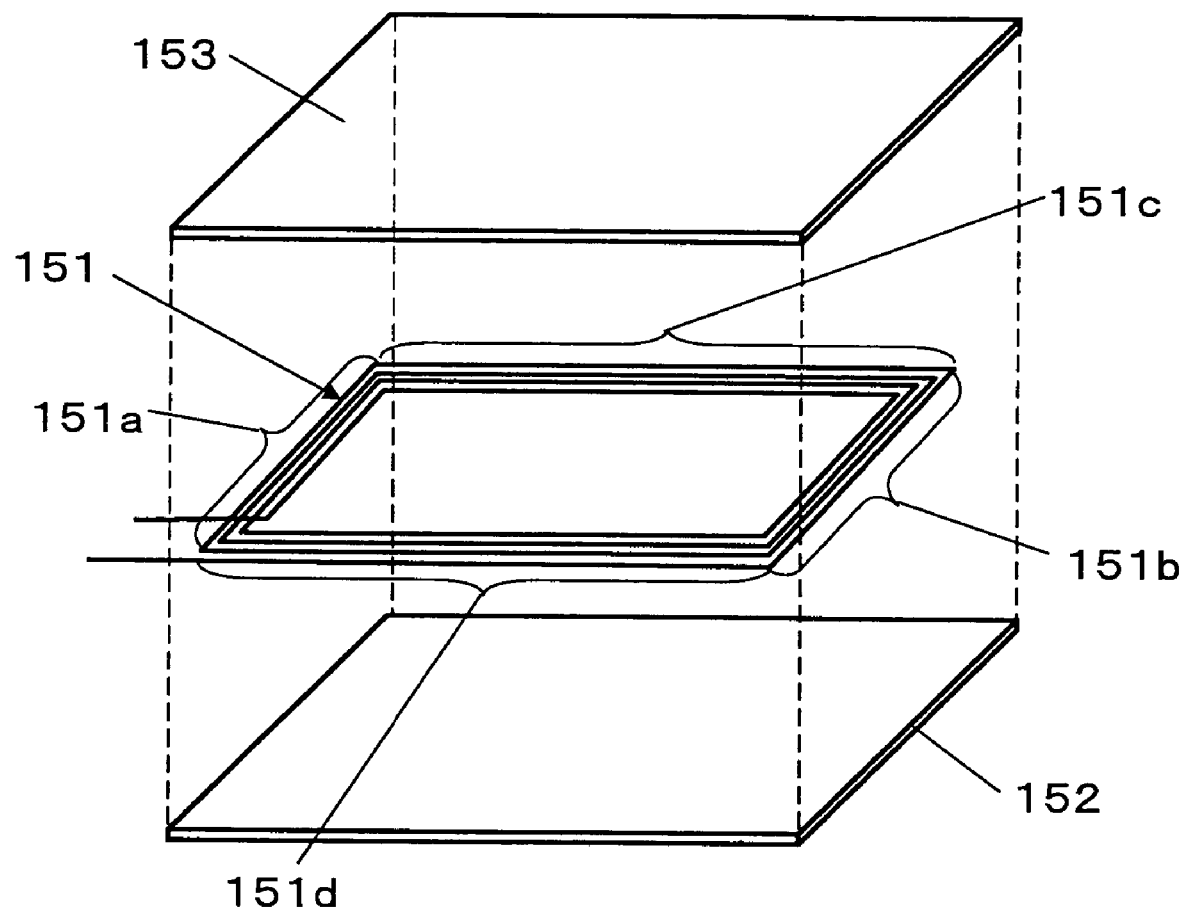
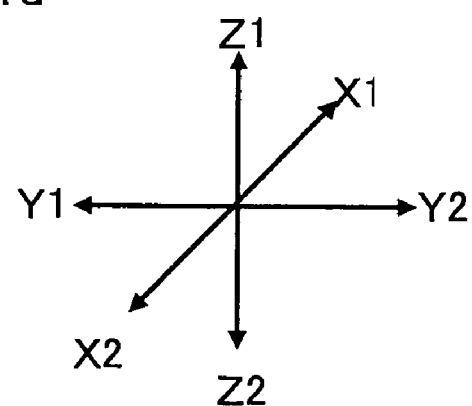

FIG.8
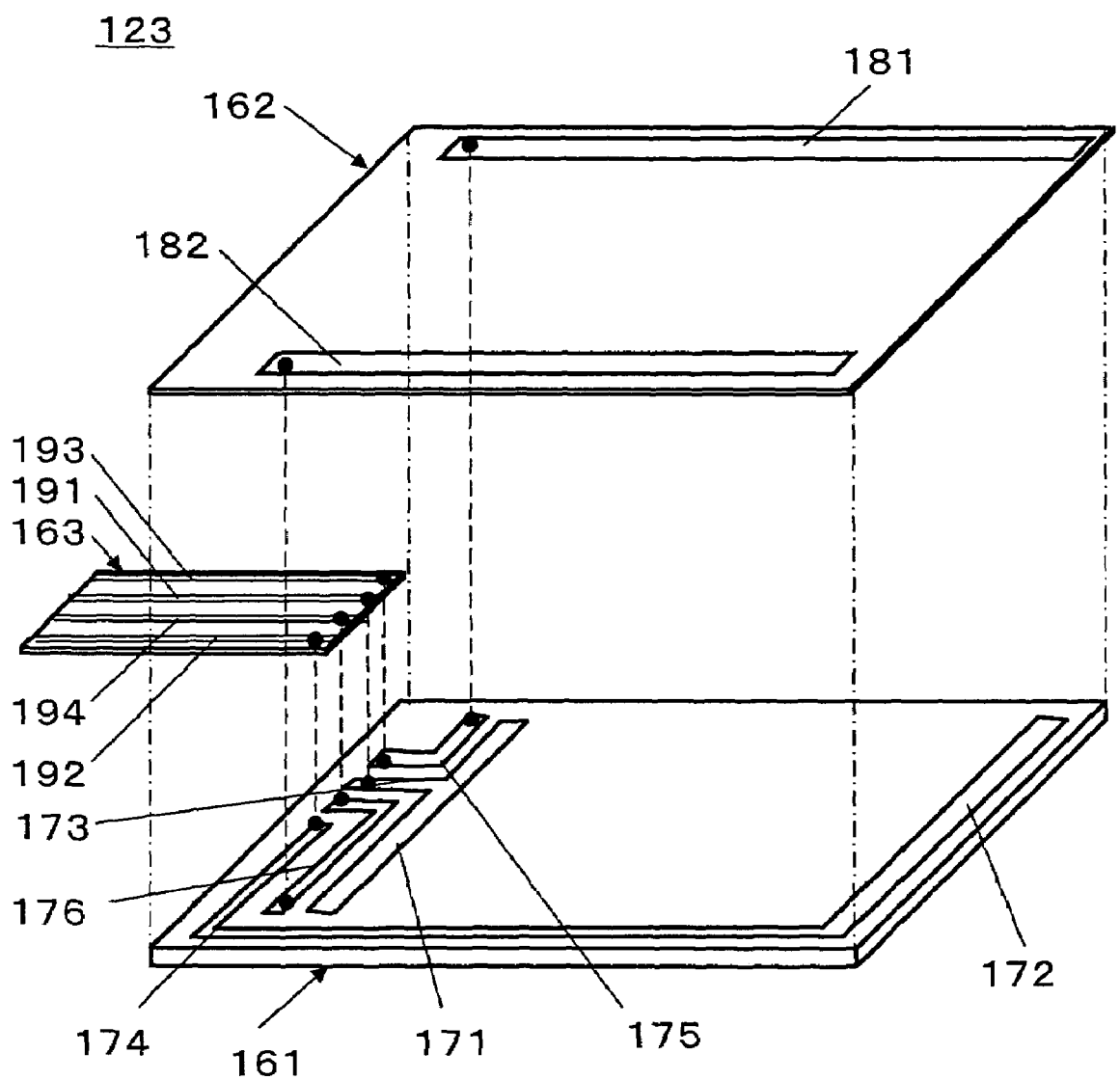
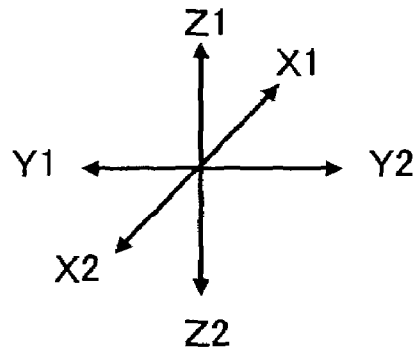

FIG.11
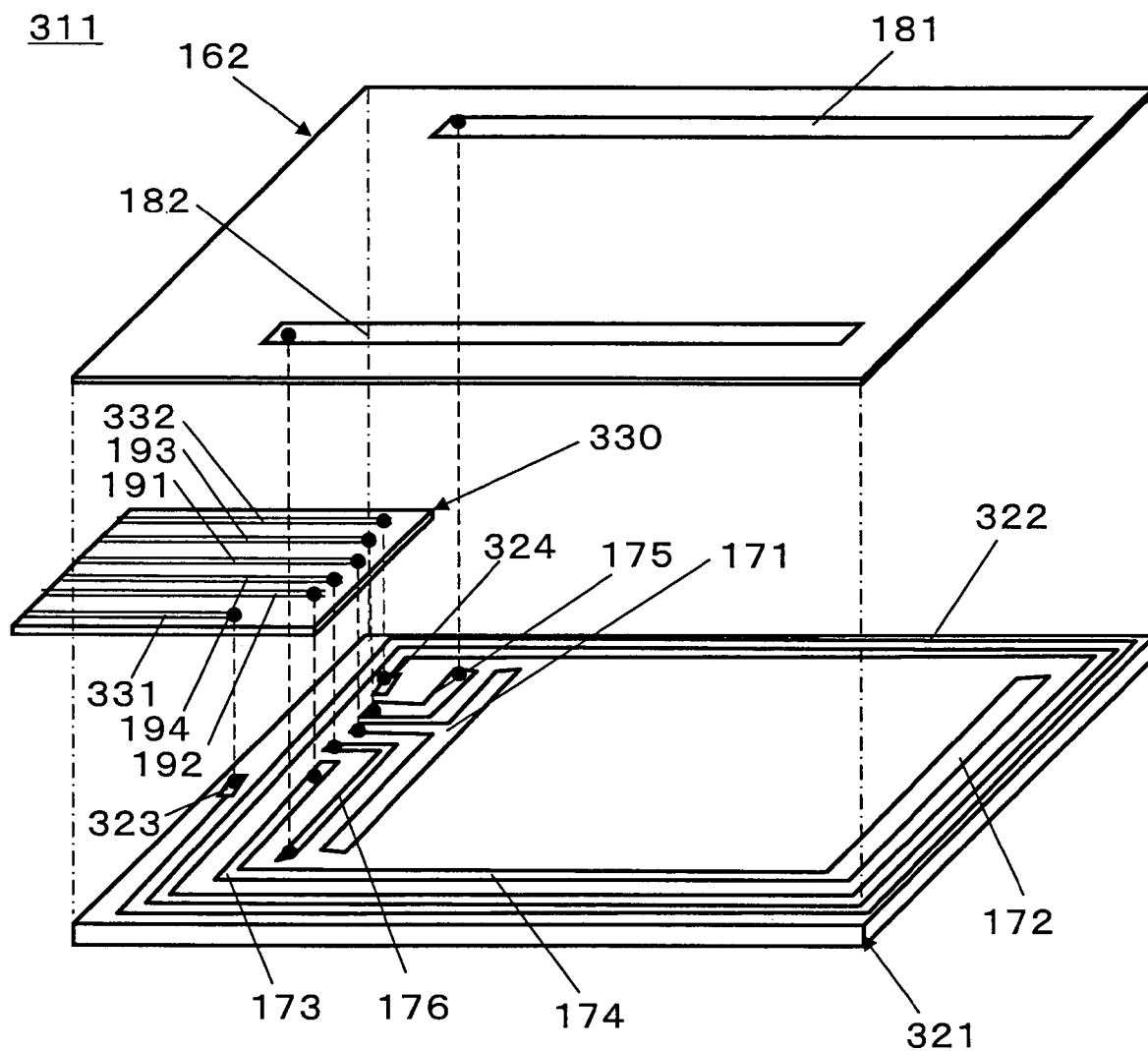
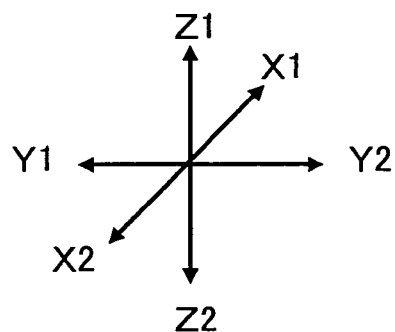

INPUT DEVICE AND DRIVING DEVICE THEREOF

BACKGROUND OF THE INVENTION

1. Field of the Invention

The present invention relates to an input device for inputting coordinates and a driving device thereof, more specifically, to an input device that vibrates an operational panel thereof in input operations, and a driving device thereof.

2. Description of the Related Art

When inputting data from a touch panel (or a touch pad) using a pen or fingers, because there is not feeling of operations, like clicking a mouse or pressing a key of a keyboard, the operator cannot clearly recognize if the panel or the pad is surely pressed with the pen or fingers and if data input is surely performed, and this causes errors in the input operation. In order for the operator to recognize the operation of pressing the touch panel or pad with the pen or fingers, it has been proposed to make the touch panel vibrate. The proposed devices are introduced below.

Japanese Patent Application Laid Open, No. 11-85400 (for example, FIG. 1) discloses a device for vibrating the touch panel by using a piezoelectric element. Japanese Utility Model Publication No. 3085481 (paragraph number 0037) discloses a device in which an actuator including coils and magnets is arranged below the touch pad of a portable personal computer. International Patent Publication WO00/078095 (from line 24 in page 38 to line 5 in page 42) discloses a planar acoustic conversion device in which the actuator for vibrating a plane includes a pair of magnets having opposite polarities and a pair of coils facing the magnets respectively. The pair of magnets and the pair of coils interact with each other magnetically, and thereby vibrate the object plane in a direction perpendicular to the plane.

In the device of the related art for vibrating the touch panel by using a piezoelectric element, because the vibration amplitude of the piezoelectric element is small, a multi-layer structure including multiple piezoelectric elements has to be used to obtain a large enough vibration amplitude. Consequently, the piezoelectric element becomes thick and expensive, and a high voltage is required to drive the piezoelectric element.

In the device of the related art in which an actuator including coils and magnets is arranged below the touch pad, it is difficult to make the device thin because of the existence of the actuator below the pad.

In the device of the related art in which the actuator for vibrating a plane includes a pair of magnets and a pair of coils, the magnets and the coils have to be arranged over the vibrating plane, and as a result, when applying this device to a touch panel in which the vibrating plane serves as a display screen, image displaying on the vibrating touch panel may be hampered.

SUMMARY OF THE INVENTION

Accordingly, it is an object of the present invention to solve the problems of the related art by providing an input device able to be made thin and secure sufficiently large vibration amplitude, and a driving device.

According to a first aspect of the present invention, there is provided an input device, comprising an input panel for inputting data when being touched, a current conducting element for conducting a driving current when the input panel is touched, said current conducting element being arranged in a region corresponding to a peripheral region of the input panel, and a magnetic field application unit configured to apply a magnetic field to the current conducting element, the magnetic field application unit being arranged in the region corresponding to the peripheral region of the input panel, wherein the magnetic field intersects the current conducting element, and a portion of the magnetic field that intersects the current conducting element is parallel to the input panel.

According to the present invention, a current conducting element is arranged in the region corresponding to the peripheral region of the input panel to conduct a driving current, and a magnetic field application unit is arranged in the region corresponding to the peripheral region of the input panel. When the driving current conducts in the current conducting element, the magnetic field application unit applies a magnetic field on the current conducting element, and the magnetic field is in parallel to the input panel and intersects the current conducting element. Therefore, according to Fleming's left-hand rule, a force is imposed on the current conducting element and the magnetic field application unit, making the current conducting element or the magnetic field application unit displace. This displacement further drives the input panel to vibrate. Consequently, the input operation can be recognized by feeling the vibration of the input panel, and good operationality may be obtained.

In addition, because it is sufficient to apply a magnetic field parallel to the input panel, and locate the current conducting element within the magnetic field, the configuration of the input device is simple, and the input device can be made thin. Further, because a magnetic field is used to generate the vibration motion, the amplitude of the vibration is large.

In addition, in the input device of the present invention, because the current conducting element and the magnetic field application unit are arranged in the region corresponding to the peripheral region of the input panel, the center portion of the input panel is open. Therefore, when the input device is used as a touch panel that serves as a display screen, image display on the touch panel is not hampered.

According to a second aspect of the present invention, there is provided a vibrating device, comprising a panel section, a current conducting element for conducting a driving current to drive the panel section to vibrate, said current conducting element being arranged in a region corresponding to a peripheral region of the panel section, and a magnetic field application unit configured to apply a magnetic field to the current conducting element, the magnetic field application unit being arranged in the region corresponding to the peripheral region of the panel section, wherein the magnetic field intersects the current conducting element, and a portion of the magnetic field that intersects the current conducting element is parallel to the panel section.

According to the present invention, because of the simple configuration, the vibrating device can be made thin, and for example, when the vibrating hence is applied to a cellular phone, it is possible to make the cellular phone thin, compact and light.

According to a third aspect of the present invention, there is provided a driving device for driving a panel to vibrate, comprising a current conducting element for conducting a driving current, said current conducting element being arranged in a region corresponding to a peripheral region of the panel, and a magnetic field application unit configured to apply a magnetic field to the current conducting element, the magnetic field application unit being arranged in the region corresponding to the peripheral region of the panel, the magnetic field intersecting the current conducting element, and a portion of the magnetic field that intersects the current conducting element being parallel to the panel.

These and other objects, features, and advantages of the present invention will become more apparent from the following detailed description of the preferred embodiments given with reference to the accompanying drawings.

BRIEF DESCRIPTION OF THE DRAWINGS

FIG. 3 is an exploded perspective view of the panel unit 111;

FIG. 4 is a perspective view of the magnet 131a;

FIG. 5 is a sectional view of the magnet 131a;

FIG. 6 is an exploded perspective view of the current conducting element 132;

FIG. 8 is an exploded perspective view of the touch panel 123;

FIG. 11 is an exploded perspective view of the touch panel 311;

DESCRIPTION OF THE PREFERRED EMBODIMENTS

Below, preferred embodiments of the present invention will be explained with reference to the accompanying drawings.

First Embodiment

Figure 1:
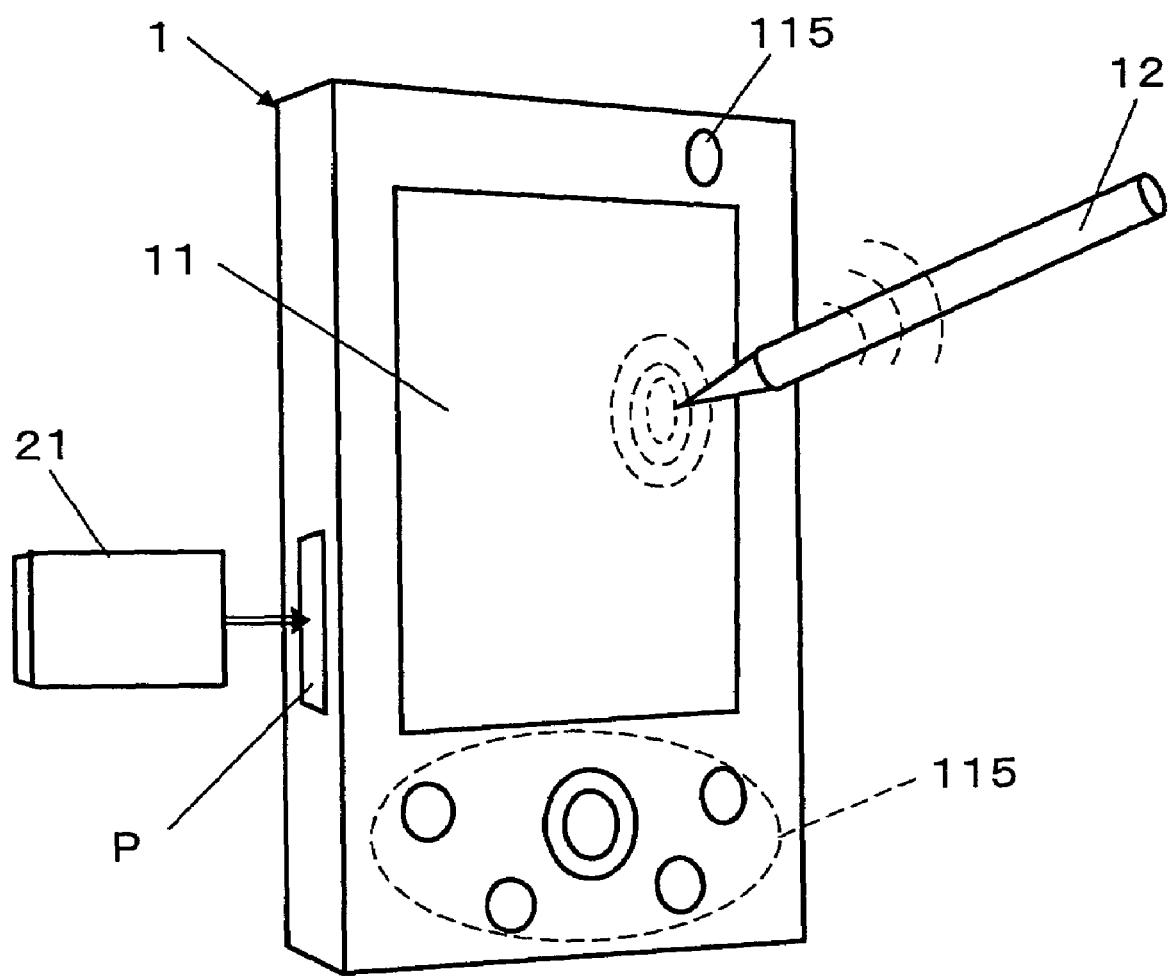
FIG. 1 is a perspective view showing an information processing system according to a first embodiment of the present invention.

FIG. 1 is a perspective view showing an information processing system according to the first embodiment of the present invention.

The information processing system 1 shown in FIG. 1 is a portable terminal such as a PDA (personal digital assistant), capable of inputting commands or texts by operating a stylus pen 12 or fingers on a screen 11. The reference numbers 21, P, and 115 indicate a memory card, an I/O port, and an input unit, respectively.

Figure 2:
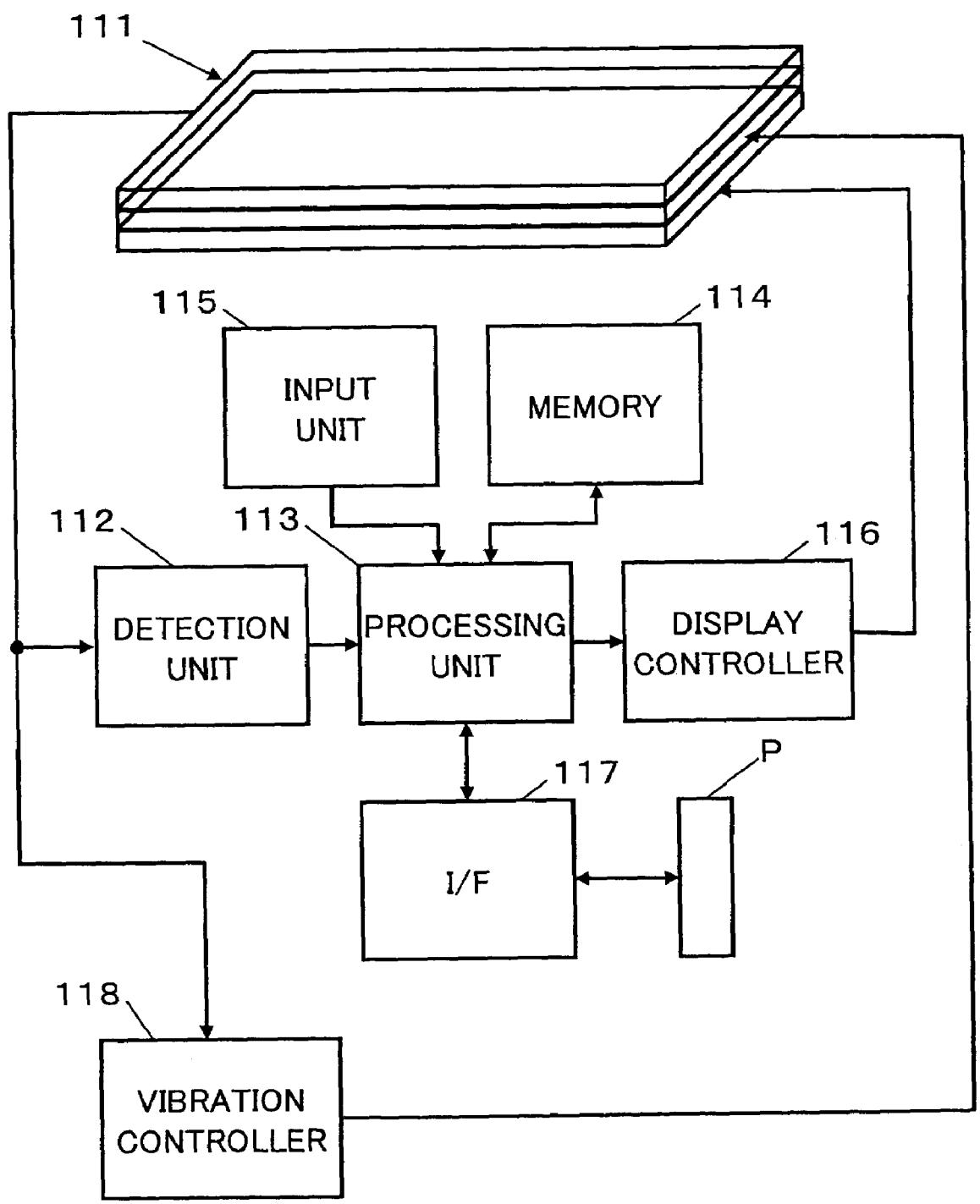
FIG. 2 is a block view showing a configuration of the information processing system according to the first embodiment of the present invention.

FIG. 2 is a block view showing a configuration of the information processing system 1.

As shown in FIG. 2, the information processing system 1 includes a panel unit 111, a detection unit 112, a processing unit 113, a memory 114, an input unit 115, a display controller 116, an interface 117, and a vibration controller 118.

FIG. 3 is an exploded perspective view of the panel unit 111.

The panel unit 111 constitutes the screen 11 illustrated in FIG. 1. It includes a display section 121, a vibration section 122, and a touch panel 123. For example, the display section 121 may be an LCD (liquid crystal display); it is controlled by the display controller 116 to display images.

The vibration section 122 includes magnets 131a through 131d and a current conducting element 132. The magnets 131a through 131d generate a magnetic field parallel to the touch panel 123, and this magnetic field is applied to the current conducting element 132.

As illustrated in FIG. 3, the magnet 131a is arranged at the end of the screen 11 in the Y1 direction, and the magnet 131b is at the end of the screen 11 in the Y2 direction. The magnet 131c is at the end of the screen 11 in the X1 direction, and the magnet 131d is at the end of the screen 11 in the X2 direction.

Figure 4:
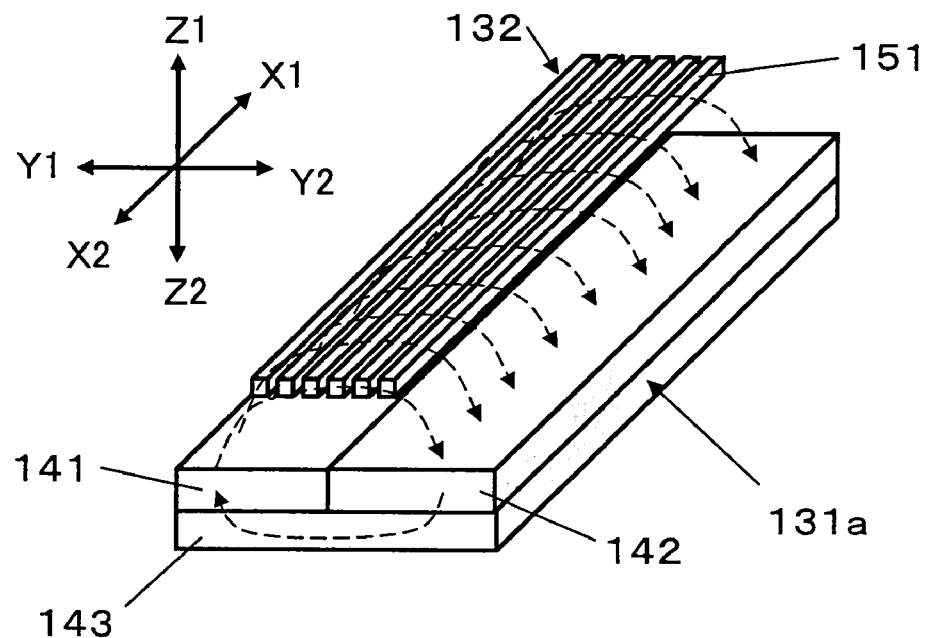
Figure 5:
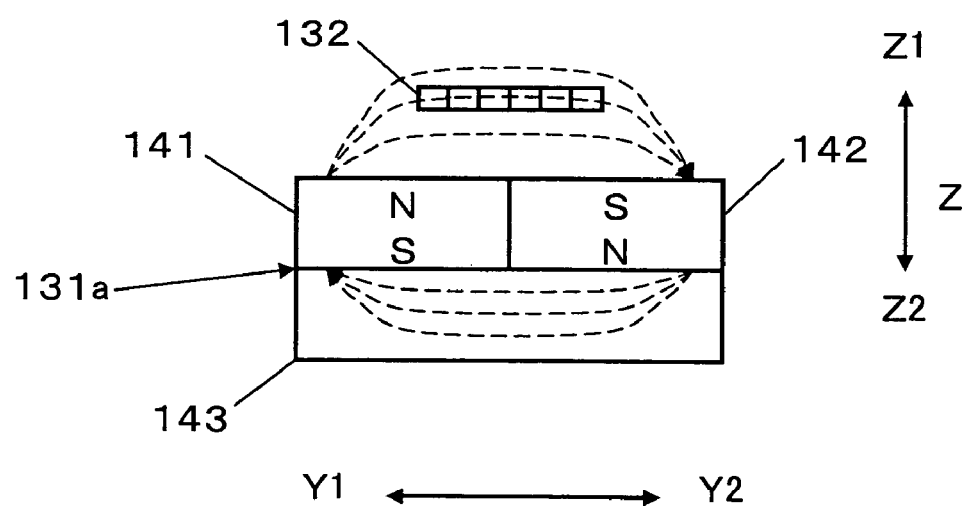

FIG. 4 is a perspective view of the magnet 131a, and FIG. 5 is a sectional view of the magnet 131a.

The magnet 131a includes a first magnet 141, a second magnet 142, and a yoke 143. The first magnet 141 and the second magnet 142 are arranged side by side on the yoke 143. The first magnet 141 is arranged in the Y1 direction with its north pole N in the Z1 direction, and its south pole S is in the Z2 direction. The second magnet 142 is arranged in the Y2 direction with its north pole N in the Z2 direction, and its south pole S is in the Z1 direction.

The first magnet 141, the second magnet 142, and the yoke 143 generate a magnetic field as illustrated by the dashed lines in FIG. 4 and FIG. 5. This magnetic field is parallel to the touch panel 123, and intersects the portion of the current conducting element 132 above the magnet 131a at substantially a right angle, that is, substantially in the Y1-Y2 direction.

The magnet 131b, the magnet 131c, and the magnet 131d have nearly the same configurations as that of the magnet 131a. That is, the magnet 131b has a first magnet 141 in the Y2 direction and a second magnet 142 in the Y1 direction;

the magnet 131c has a first magnet 141 in the X1 direction and a second magnet 142 in the X2 direction; the magnet 131d has a first magnet 141 in the X2 direction and a second magnet 142 in the X1 direction.

The magnet 131a, the magnet 131b, the magnet 131c, and the magnet 131d generate magnetic fields in the periphery of the screen 11. The magnetic fields are parallel to the screen 11, and extend inward to the center of screen 11. The current conducting element 132 is above the magnet 131a, the magnet 131b, the magnet 131c, and the magnet 131d, that is, on the Z1 side of these magnets. Specifically, the current conducting element 132 is disposed on the lower side of the touch panel 123.

FIG. 6 is an exploded perspective view of the current conducting element 132.

The current conducting element 132 is formed by bonding transparent resin films 152 and 153 with a conductive material, for example, conductive wire 151 in between, and the conductive wire 151 swirls in the peripheries of the transparent resin films 152 and 153 and forms a rectangular shaped coil.

The side 151a of the conductive wire 151, that is, the Y1 direction of the conductive wire 151, is above the magnet 131a, and is acted on by the magnetic field generated by the magnet 131a.

Similarly, on the Y2 side of the conductive wire 151, the side 151b is above the magnet 131b, and is acted on by the magnetic field generated by the magnet 131b; on the X1 side of the conductive wire 151, the side 151c is above the magnet 131c, and is acted on by the magnetic field generated by the magnet 131c; on the X2 side of the conductive wire 151, the side 151d is above the magnet 131d, and is acted on by the magnetic field generated by the magnet 131d.

The conductive wire 151 is connected with the vibration controller 118, and is fed with a driving current from the vibration controller 118. When the vibration controller 118 feeds a driving current to the side 151a in the X2 direction, the driving current conducts in the X1 direction in the side 151b, in the Y1 direction in the side 151c, and in the Y2 direction in the side 151d. Due to the driving current conducting in the conductive wire 151, the magnetic fields generated by the magnets 131a through 131d interact with each other, imposing forces on the conductive wire 151 in the Z1 direction or Z2 direction. For example, in FIG. 4, if the driving current conducts in the conductive wire 151 in the X2 direction, because the magnetic field generated by the magnet 131a is in the Y2 direction, as indicated by the dashed lines, according to the Fleming's left-hand rule, a force in the Z1 direction is imposed on the conductive wire 151, and the magnitude of the force is determined by the magnitude of the current. Similarly, if the driving current conducts in the conductive wire 151 in the X1 direction, a force in the Z2 direction is imposed on the conductive wire 151.

If the direction of the driving current is reversed periodically, the conductive wire 151 moves up and down, causing the current conducting element 132 to move up and down.

As will be appreciated by those of ordinary skills in the art, the above description is applicable in a corresponding manner to the magnet 131b and the side 151b of the conductive wire 151, as well as to the magnet 131c and the side 151c, and to the magnet 131d and the side 151d. Consequently, the current conducting element 132 as a whole moves up and down.

Figure 7:
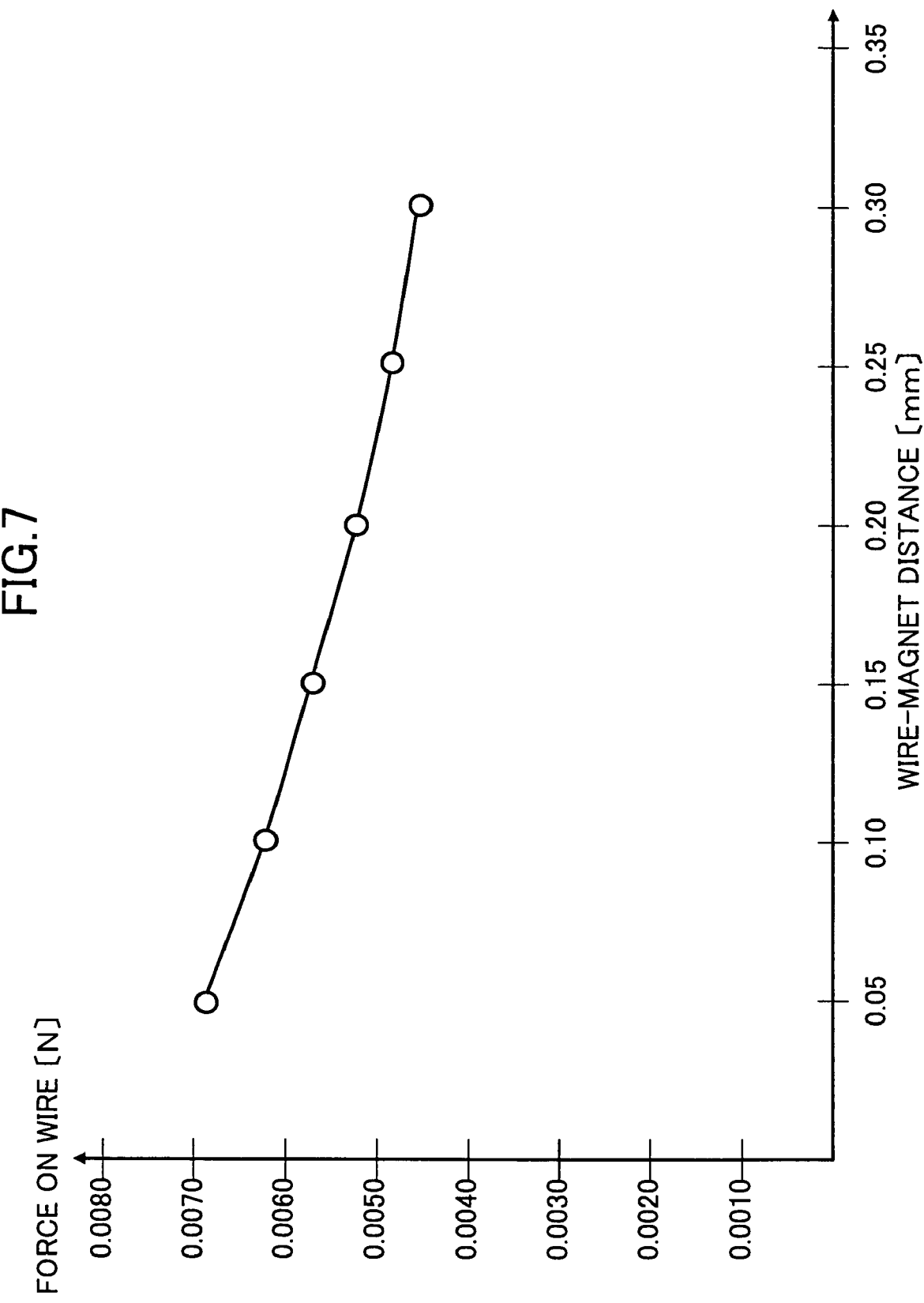
FIG. 7 is a graph showing simulation results of the relation between the distance from a conductive element to magnets and the force imposed on the conductive wire.

FIG. 7 is a graph showing simulation results of the relation between the distance from a conductive wire and magnets and the force imposed on such a conductive wire.

Here, it is assumed that the conductive wire is 1.0 mm in width, 220 mm in length, and 0.01 mm in thickness. There are two magnets, each is 1.0 mm in thickness, and 1.5 mm in width. The two magnets are arranged so that their poles are in opposite direction, as shown in FIG. 5, and generate a parallel magnetic field. The conductive wire is arranged above the magnets, and exposed to the magnetic field generated by the pair of magnets; a current of 0.1 A is conducted in the conductive wire, and the conductive wire is forced to move to or away from the magnets.

FIG. 7 shows the simulated force imposed on the conductive wire when the distance between the conductive wire and the magnets changes from 0.05 mm to 0.3 mm. As shown by the graph in FIG. 7, the magnitude of the force on the conductive wire decreases slowly, and is still quite large even though the distance from the conductive wire to the magnets is changed from 0.05 mm to 0.3 mm. Therefore, it is possible to make the conductive wire vibrate, and large vibration amplitude can be obtained.

The above current conducting element 132 is disposed on the lower side of the touch panel 123, for example, it pasted on the lower side of the touch panel 123.

Next, the touch panel 123 is described in detail.

FIG. 8 is an exploded perspective view of the touch panel 123.

The touch panel 123 includes a lower substrate 161, an upper substrate 162, and a terminal substrate 163.

The lower substrate 161 includes a glass substrate covered by a transparent conductive film such as ITO (Indium Tin Oxide), and electrodes 171, 172, and connections 173 through 176 formed on the glass substrate. The electrode 171 is placed on the Y1 side of the lower substrate 161 and extends along the X1-X2 direction. The electrode 171 is connected to a connector provided at the Y1 direction edge of the lower substrate 161 via the connection 173. The electrode 172 is on the Y2 side of the lower substrate 161 and extends along the X1-X2 direction. The electrode 172 is connected to the connector provided at the Y1 side edge of the lower substrate 161 via the connection 174.

The upper substrate 162 includes a synthetic resin film such as a PET (poly ethylene telephtalete) covered by a transparent conductive film such as ITO, and electrodes 181, 182 formed on the glass substrate. The upper substrate 162 and the lower substrate 161 form a stacked structure with a suitable interval between them. The upper substrate 162 bends when pressed by the stylus pen 12 or fingers, and is brought into contact with the lower substrate 161. In order to avoid unnecessary contact between the upper substrate 162 and the lower substrate 161, dot spacers are interposed between them, whereby the transparent conductive film of the lower substrate 161 and the transparent conductive film of the upper substrate 162 can be brought into contact when, for example, the upper substrate 162 is pressed at a pressure not less than a preset value.

The electrode 181 is placed on the X1 side of the upper substrate 162 and extends along the Y1-Y2 direction. An end of the electrode 181 is connected to the connection 175 on the lower substrate 161, as is illustrated by a vertical dashed line in FIG. 8. The connection 175 is connected to the connector provided at the Y1 side edge of the lower substrate 161.

The electrode 182 is placed on the X2 side of the upper substrate 162 and extends along the Y1-Y2 direction. An end of the electrode 181 is connected to the connection 176 on the lower substrate 161, as is illustrated by a vertical dashed line in FIG. 8. The connection 176 is connected to the connector provided at the Y1 side edge of the lower substrate 161.

The terminal substrate 163 includes a flexible printed circuit board on which connections 191 through 194 are formed, and connects the touch panel 123 with the detection unit 112. The connections 191 through 194 are connected to the connections 173 through 176 on the lower substrate 161, respectively, as is illustrated by a vertical dashed line in FIG. 8. Further, the connections 191 through 194 are connected in a suitable manner to the detection unit 112.

The detection unit 112 applies a voltage between the electrodes 171 and 172, and measures the voltage of the upper substrate 162, and thereby detects the position of the contact point in the Y1-Y2 direction (below, referred to as Y coordinate). In addition, the detection unit 112 applies a voltage between the electrodes 181 and 182, and measures the voltage of the lower substrate 161, and thereby detects the position of the contact point in the X1-X2 direction (below, referred to as X coordinate). The detection unit 112 repeats the measurement of the X coordinate and the measurement of the Y coordinate, and thereby obtains two dimensional coordinates.

One of the connections 191 through 194 on the terminal substrate 163, for example, the connection 191, is connected to the vibration controller 118 in order to detect operations of the touch panel 123.

Figure 9:
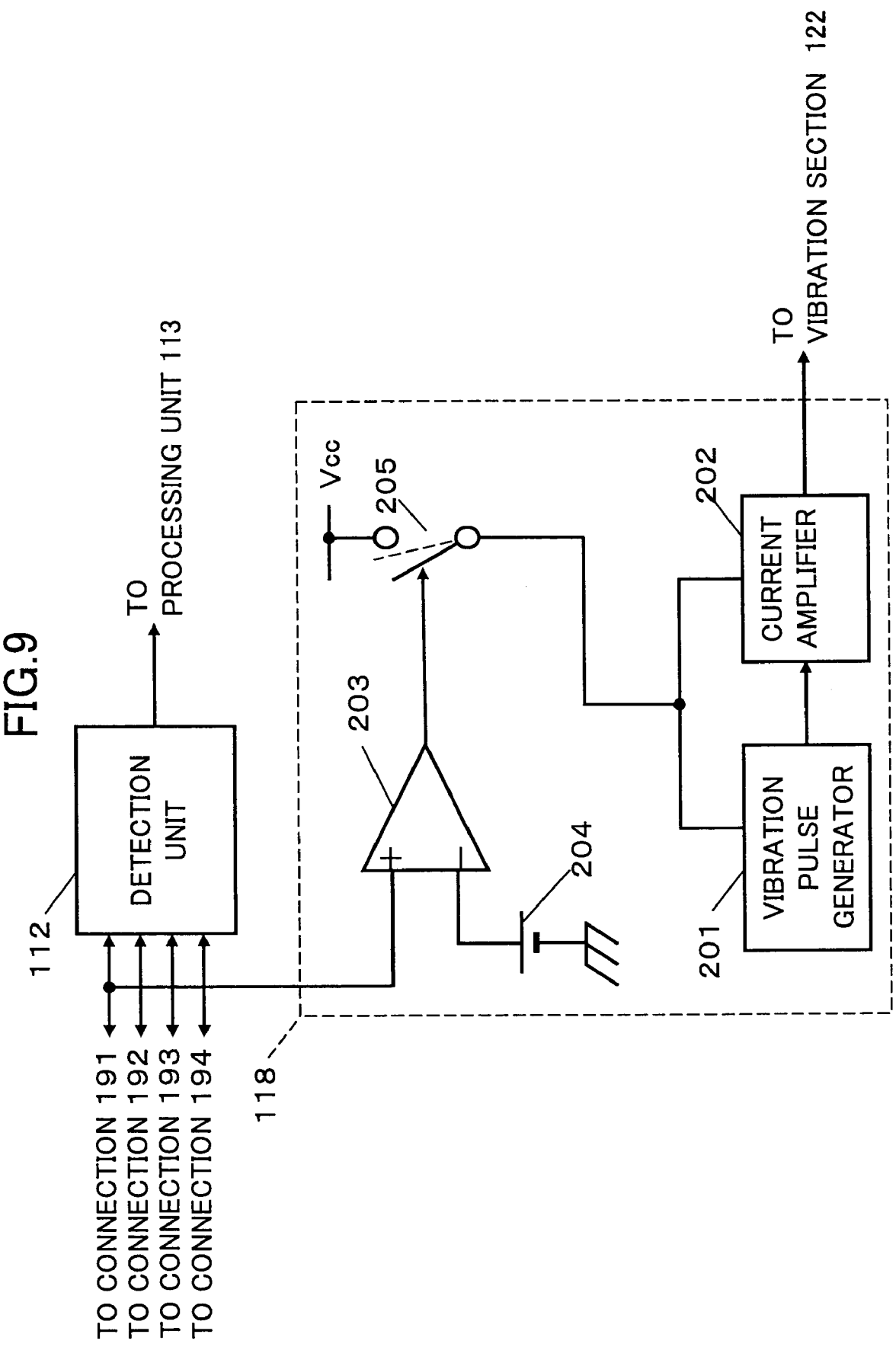
FIG. 9 is a block view showing a configuration of the vibration controller 118.

FIG. 9 is a block view showing a configuration of the vibration controller 118.

The vibration controller 118 includes a vibration pulse generator 201, a current amplifier 202, a comparator 203, a reference power supply 204, and a switch 205.

The vibration pulse generator 201 includes an oscillation circuit, and generates an oscillation signal causing vibrations easily perceivable by an operator. For example, the frequency of the oscillation signal may be in the range from 10 to 100 Hz. The oscillation signal generated by the vibration pulse generator 201 is supplied to the current amplifier 202. The current amplifier 202 generates a driving current according to the oscillation signal, and sends it to the conductive wire 151 of the current conducting element 132, which forms part of the vibration section 122.

The reference power supply 204 generates a reference voltage. The reference voltage is set to be slightly lower than the minimum voltage on the connections for coordinate detection when the upper substrate 162 and the lower substrate 161 are in contact with each other. For example, the reference voltage is set to be slightly lower than the minimum voltage on the connection 191, which is connected to the electrode 171 through the connection 173, when the upper substrate 162 and the lower substrate 161 are in contact with each other, so that all occurrence of contact can be detected. It is should be noted that the voltage at the connection 191 is lower than the reference voltage when the upper substrate 162 and the lower substrate 161 are not in contact.

A driving voltage Vcc is supplied to the vibration pulse generator 201 and the reference power supply 204 via the switch 205. The switch 205 operates according to the output of the comparator 203.

The non-inverted input terminal of the comparator 203 is connected to the connection 191. A voltage is applied to the connection 191, which is connected to the electrode 171 through the connection 173, and the reference voltage from the reference power supply 204 is applied to the inverted input terminal. The comparator 203 outputs a signal at a low level when the voltage at the connection 191 is lower than the reference voltage, that is, the lower substrate 161 and the upper substrate 162 of the touch panel 123 are not in contact with each other. On the other hand, the comparator 203 outputs a signal at a high level when the voltage at the connection 191 is higher than the reference voltage, that is, the lower substrate 161 and the upper substrate 162 of the touch panel 123 are in contact with each other.

The switch 205 is turned off when the output of the comparator 203 is at the low level, that is, the lower substrate 161 and the upper substrate 162 of the touch panel 123 are not in contact with each other, and supply of the driving voltage Vcc to the vibration pulse generator 201 and the current amplifier 202 is suspended. The vibration pulse generator 201 and the current amplifier 202 then stop operations, and no driving current is fed to the conductive wire 151 of the current conducting element 132, which forms part of the vibration section 122. Resultantly, the vibration section 122 comes into a non-vibrating state.

On the other hand, the switch 205 is turned on when the output of the comparator 203 is at the high level, that is, the lower substrate 161 and the upper substrate 162 of the touch panel 123 are in contact with each other, and supply of the driving voltage Vcc to the vibration pulse generator 201 and the current amplifier 202 is resumed. The vibration pulse generator 201 and the current amplifier 202 then start to operate, and a driving current determined according to the oscillation signal is fed to the conductive wire 151 of the current conducting element 132, which constitutes part of the vibration section 122. Further, the vibration section 122 starts to vibrate the touch panel 123 at a frequency from 10 Hz to 100 Hz according to the oscillation signal.

As described above, when the touch panel is pressed by the stylus pen 12 or fingers, and the lower substrate 161 and the upper substrate 162 of the touch panel 123 are in contact with each other, the touch panel 123 vibrates at a frequency from 10 Hz to 100 Hz accordingly, thereby enabling the operator to have feeling of operation.

The X and Y coordinates measured by the detection unit 112 are output to the processing unit 113. The processing unit 113 operates under the instructions in programs stored in the memory 114, recognizes commands according to the coordinate positions measured by the detection unit 112, and performs processing of data input. In addition, the processing unit 113 controls the display controller 116 which displays images on the display section 121.

The input unit 115 may includes a power button, an application start button, a cursor movement button, and others. Commands corresponding to the operations of the input unit 115 are sent to the processing unit 113, and the processing unit 113 operates accordingly.

The interface 117 is a circuit between the processing unit 113 and the I/O port P. The I/O port P may be, for example, a port for connecting the memory card 21, such as an SD (security digital) card, an MMC (multi media card), or a CF (compact flash card).

The touch panel 123 shown in FIG. 8 is a so-called analogue resistant film touch panel. It should be noted that the touch panel 123 is not limited to the configuration in FIG. 8, any and suitable touch panel having other kinds of electrodes and under other operational principles may be used. The present invention is not limited by the operational principles of the illustrated touch panel.

In the present embodiment, although it is described above that the current conducting element 132 is pasted on the lower side of the lower substrate 161 of the touch panel 123, the conductive wire 151 of the current conducting element 132 may also be patterned on the lower substrate 161 of the touch panel 123.

Figure 10:
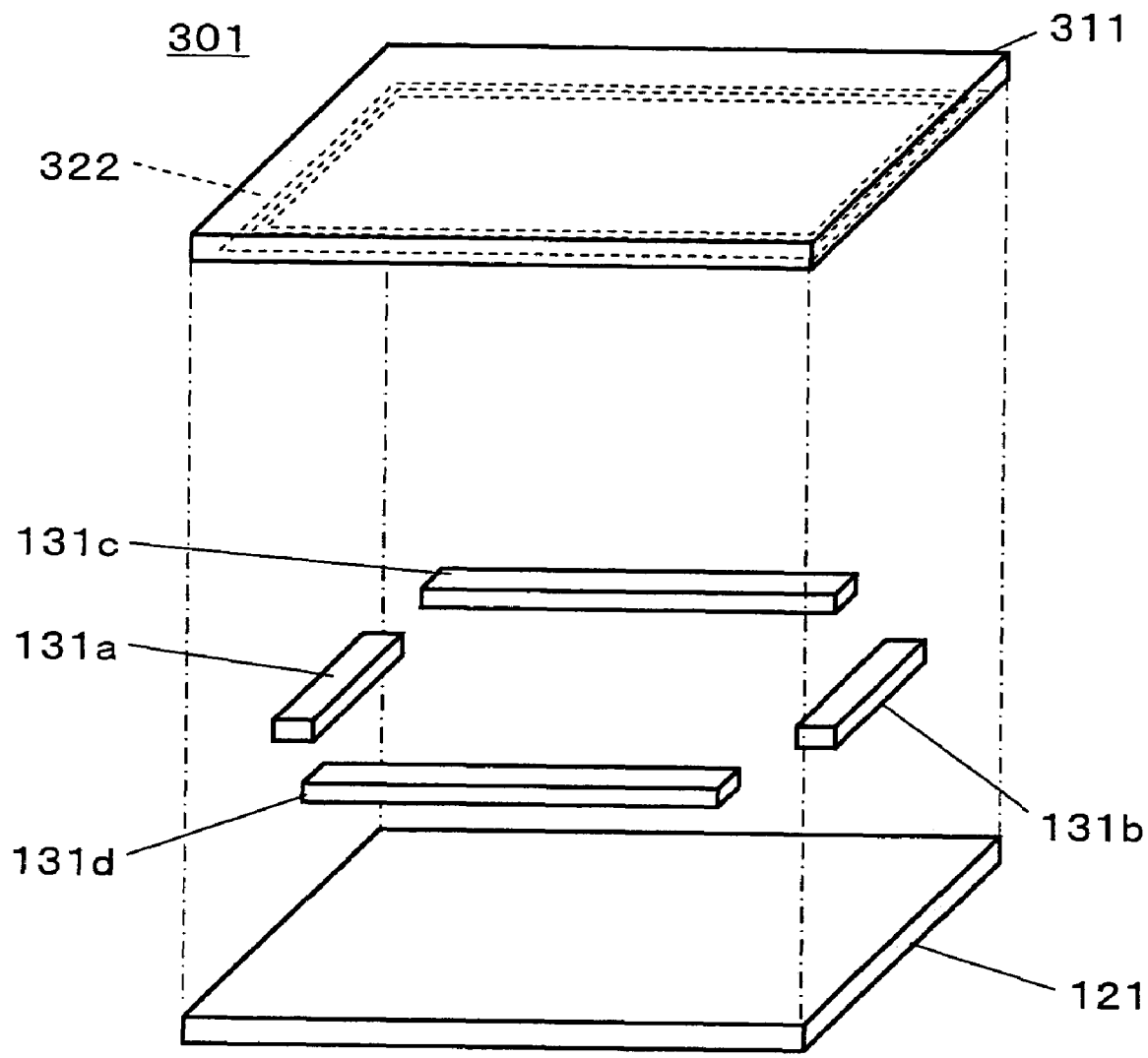
FIG. 10 is an exploded perspective view of a first modification to the panel unit 111.

FIG. 10 is an exploded perspective view of a first modification to the panel unit 111. Here, the same reference numbers are used for the same elements as in FIG. 3, and the overlapping descriptions are omitted.

In the panel unit 301 shown in FIG. 10, instead of the current conducting element 132 and the conductive wire 151 thereof shown in FIG. 3, a conductive pattern 322 is formed on the lower side of the lower substrate 321 of the touch panel 311.

FIG. 11 is an exploded perspective view of the touch panel 311.

In the lower substrate 321 of the touch panel 311 in this example, the conductive pattern 322 is in nearly the same shape as that of the conductive wire 151. The conductive pattern 322, the connection pads 323 and 324 are formed on a transparent conductive film by the same process as that for forming the electrodes 171, 172, and connections 173 through 176. On the terminal substrate 330, in addition to the connections 191 through 194, connections 331 and 332 are formed to connect to the connection pads 323 and 324.

According to this example, the conductive pattern 322 which interacts with the parallel magnetic field generated by the magnets 131a through 131d is formed in the touch panel 311. Hence the current conducting element 132 is not necessary, and this can reduce the number of parts.

In this example, it is described that the conductive pattern 322 is formed on the upper side of the lower substrate 321, which faces the upper substrate 162, but the conductive pattern 322 may also be formed on the lower side of the lower substrate 321, that is, on the surface on the Z2 side.

In the present embodiment, it is described above that the current conducting element 132 is pasted on the touch panel 123, and the magnets 131a through 131d are arranged facing the current conducting element 132. As an alternative, the magnets 131a through 131d may also be pasted on the touch panel 123.

Figure 12:
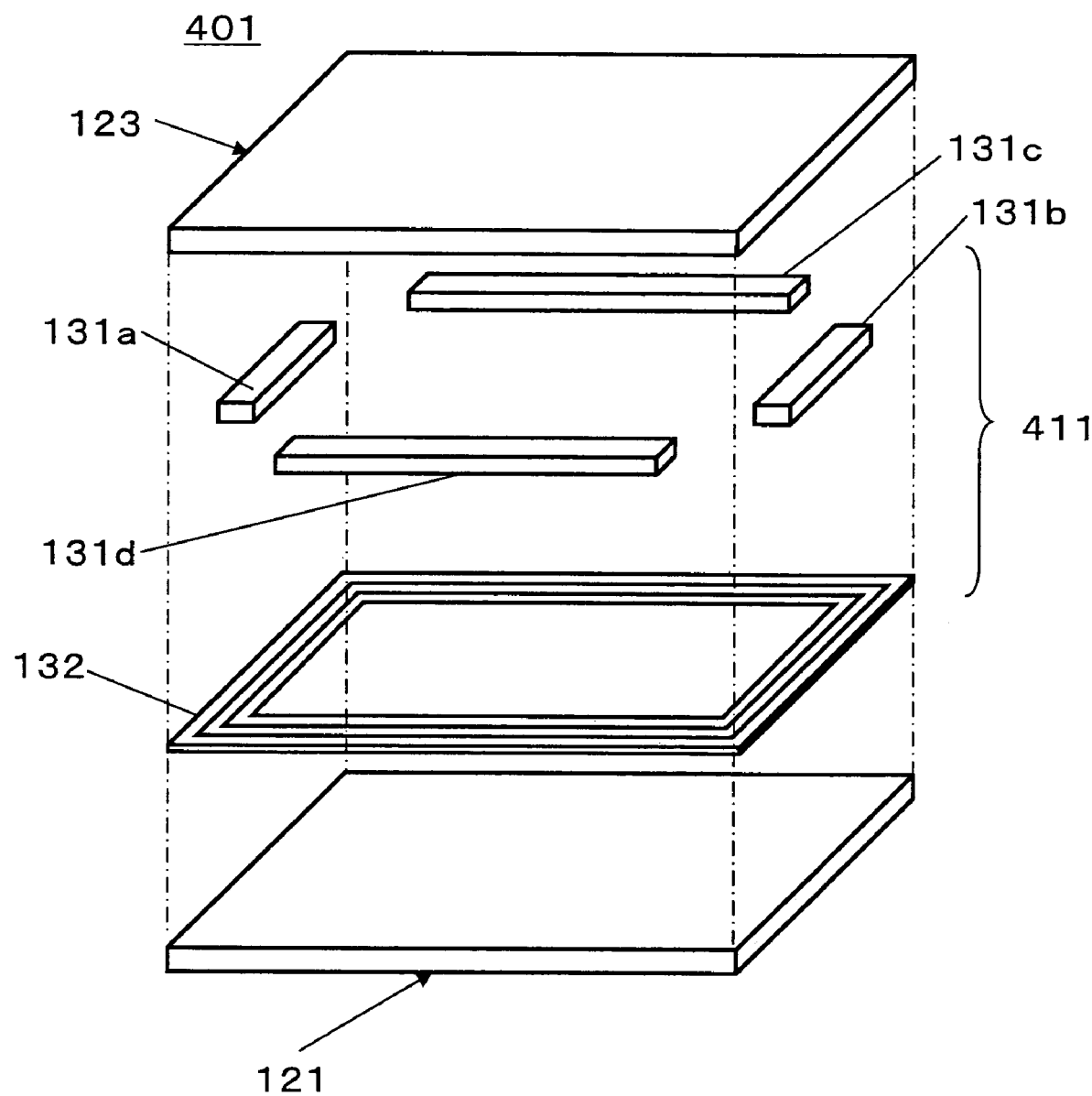
FIG. 12 is an exploded perspective view of a second modification to the panel unit 111.

FIG. 12 is an exploded perspective view of a second modification to the panel unit 111. Similarly, the same reference numbers are used for the same elements as in FIG. 3, and the overlapping descriptions are omitted.

In the panel unit 401 of this example, the configuration of the vibration section 411 is different from that in FIG. 3. In the vibration section 411 of this example, the magnets 131a through 131d are pasted on the lower side of the touch panel 123, and the current conducting element 132 is fixed on a frame or others. With the panel unit 401, the vibration controller 118 supplies a driving current to the conductive wire 151 of the current conducting element 132, and a force is imposed on the magnets 131a through 131d to vibrate the touch panel 123.

In the present embodiment, it is described above that only the touch panel 123 is vibrated, alternatively, both the display section 121 and the touch panel 123 may be vibrated.

Figure 13:
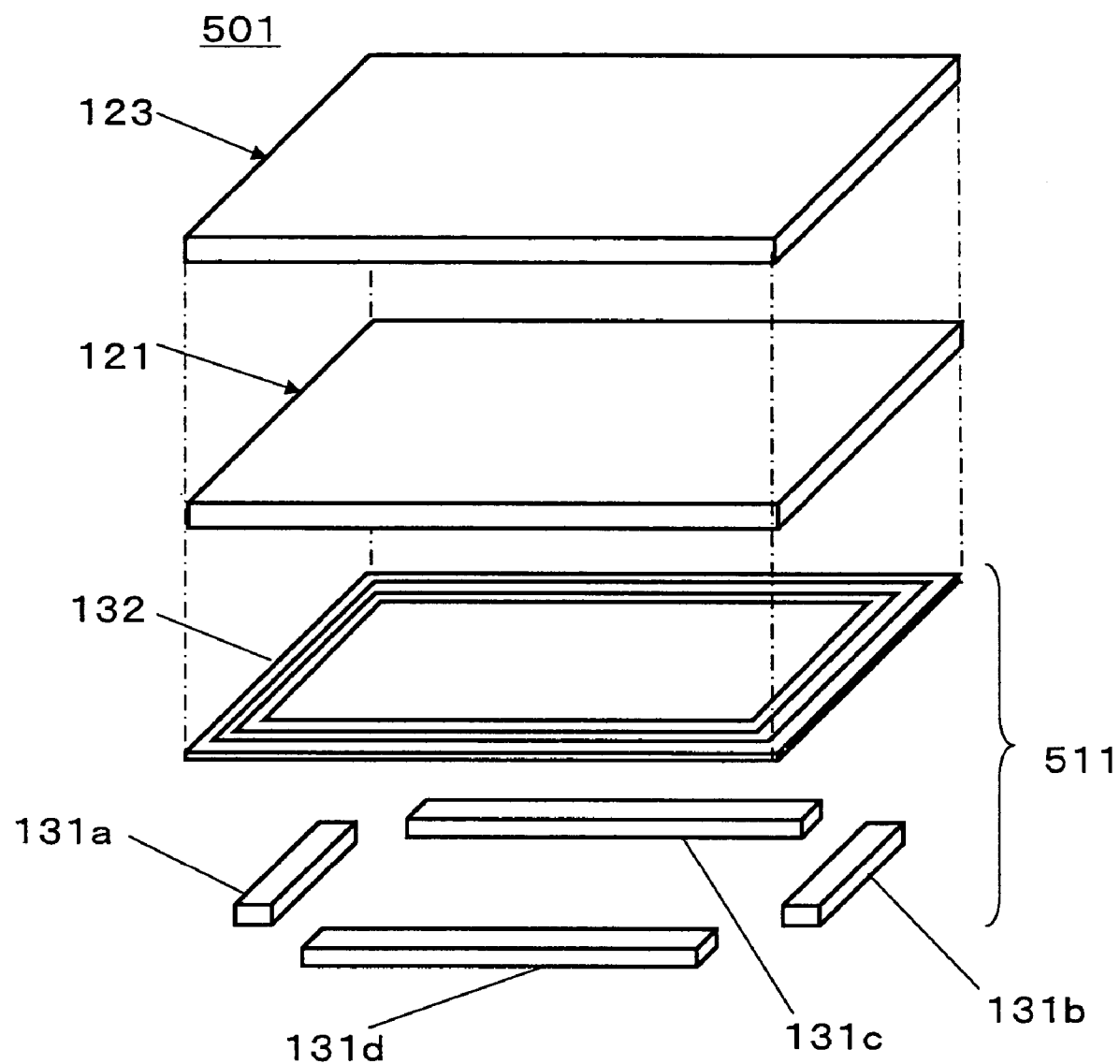
FIG. 13 is an exploded perspective view of a third modification to the panel unit 111.

FIG. 13 is an exploded perspective view of a third modification to the panel unit 111. Similarly, the same reference numbers are used for the same elements as in FIG. 3, and the overlapping descriptions are omitted.

In this example, the position of the vibration section 511 in the panel unit 511 is different from the vibration section 122 in the panel unit 111 in FIG. 3. In the vibration section 511 of this example, The display section 121 is fixed above the touch panel 123, and the vibration section 511 is arranged below the display section 121, that is, in the Z2 direction. In the vibration section 511, the magnets 131a through 131d are pasted on a frame or others, and the current conducting element 132 is pasted on the lower side of the display section 121.

With the panel unit 511, the vibration controller 118 supplies a driving current to the conductive wire 151 of the current conducting element 132 in the parallel magnetic fields generated by the magnets 131a through 131d, and forces are imposed on the conductive wire 151 in the directions Z1 and Z2 to vibrate the display section 121 and the touch panel 123.

According to this example, the display section 121 and the touch panel 123 are in close contact, and it is possible to make the display position on the display section 121 the same as the touching position on the touch panel 123 by feeling.

In the above, it is described that the touch panel 123 or the display section 121 is moved up and down, but they may also be made to swing.

Figure 14:
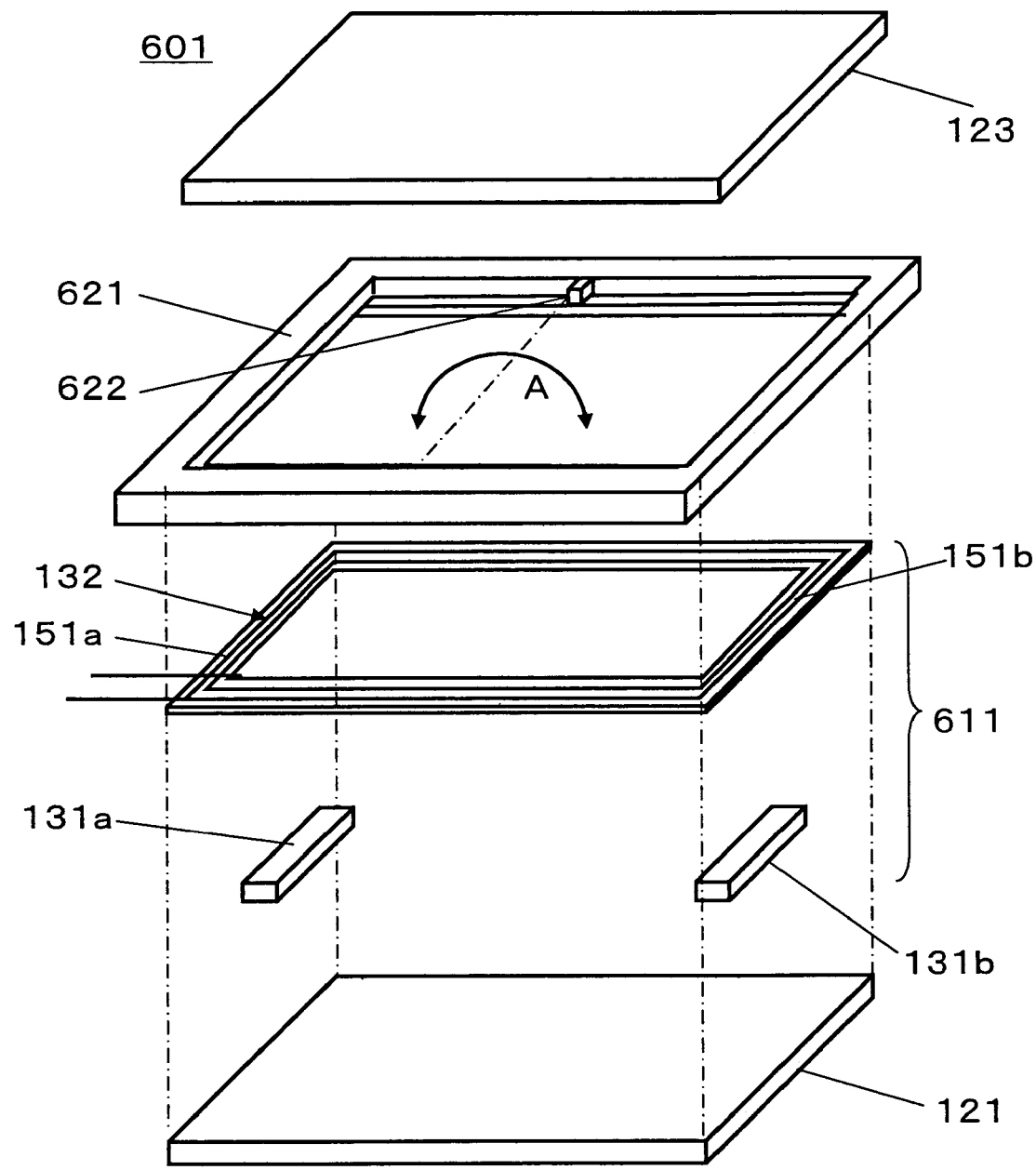
FIG. 14 is an exploded perspective view of a panel unit 601, which is a fourth modification to the panel unit 111.

FIG. 14 is an exploded perspective view of a fourth modification to the panel unit 111. Similarly, the same reference numbers are used for the same elements as in FIG. 3, and the overlapping descriptions are omitted.

As shown in FIG. 14, in the panel unit 601, the supporting mechanism of the touch panel 123 and the configuration of the vibration section 611 are different from those in FIG. 3.

In the panel unit 601, the touch panel 123 is supported nearly at the center of the sides extending in the Y1 and Y2 directions by a supporting member 622 located on a frame 621, whereby the touch panel 123 is swingable along the direction indicated by the arrow A.

The vibration section 611 includes the magnets 131a and 131b, but not the magnets 131c and 131d.

Figure 15:
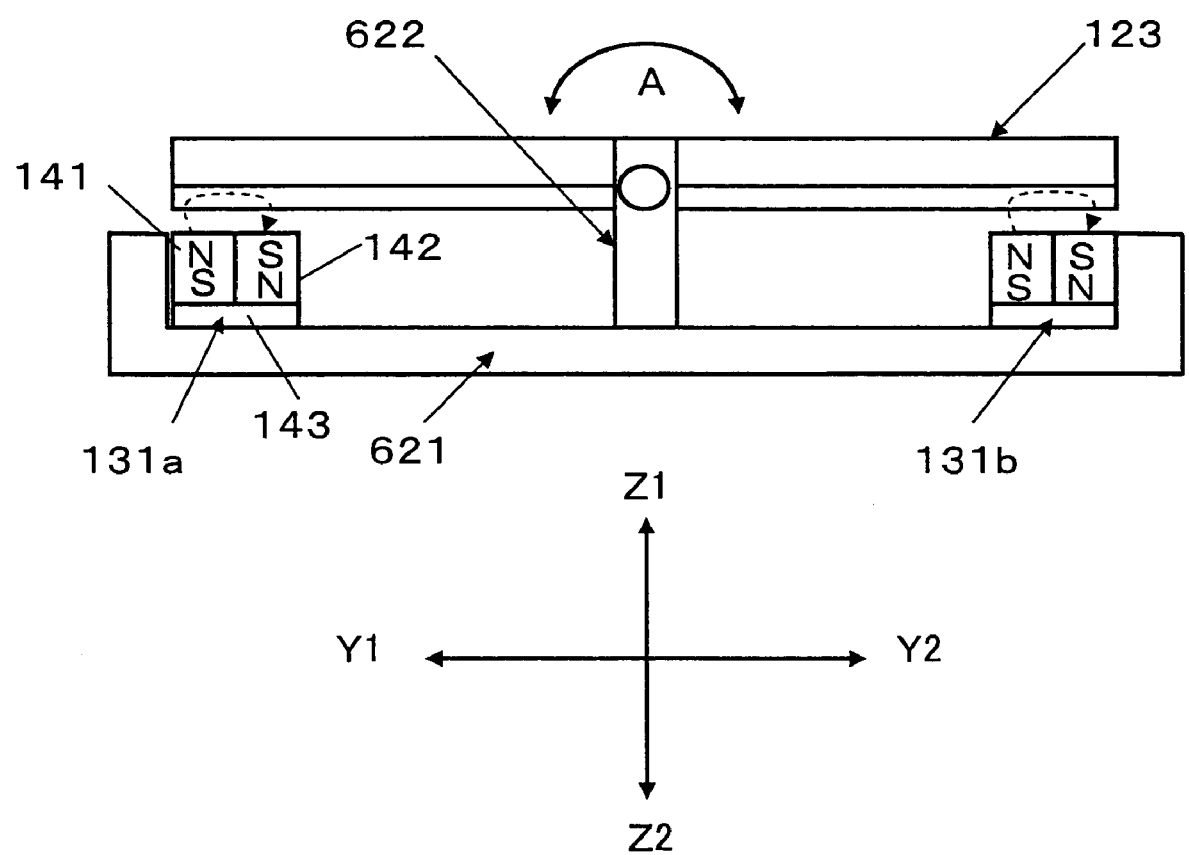
FIG. 15 is a sectional view of the panel unit 601.

FIG. 15 is a sectional view of a principal portion of the panel unit 601.

As shown in FIG. 15, the magnets 131a and 131b are located in the Y1 direction and the Y2 direction, respectively, and arrangement of the magnetic poles of the magnet 131b is the same as that of the magnet 131a.

According to this example, when the vibration controller 118 supplies a driving current to the conductive wire 151 of the current conducting element 132 in the parallel magnetic fields generated by the magnets 131a and 131b, forces are imposed on the side 151a in the direction Z1 and on the side 151b in the direction Z2, and thereby, the touch panel 123, which is supported by the supporting member 612, swings in the direction A.

In the present embodiment, it is described that vibration controller 118 detects the operations of the touch panel 123, and cause the vibration section 122 to vibrate. Alternatively, the touch panel 123 may be vibrated by other means, for example, the processing unit 113 may generate a vibration signal, and the vibration signal may be supplied to the vibration section 122 through the current amplifier.

Second Embodiment

Figure 16:
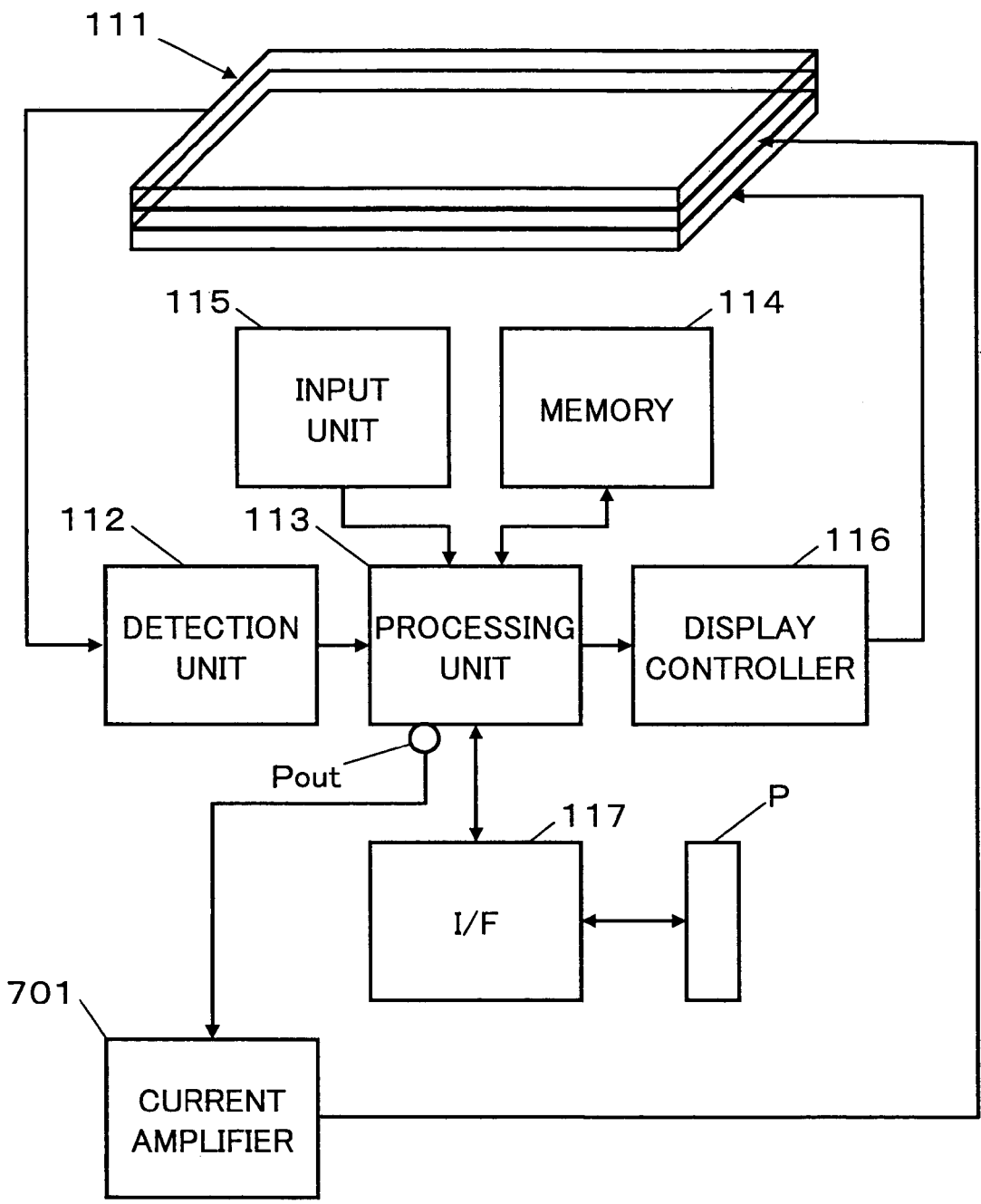
FIG. 16 is a block view showing a configuration of an information processing system according to a second embodiment of the present invention.

FIG. 16 is a block view showing a configuration of an information processing system 700 according to a second embodiment of the present invention. Here, the same reference numbers are used for the same elements as in FIG. 2, and the overlapping descriptions are omitted.

In the information processing system 700 shown in FIG. 16, the processing unit 113 generates signals in the frequency range from 10 Hz to 100 Hz according to operations on the touch panel 123, and the current amplifier 701 amplifies the signals and sends them to the vibration section 122.

Figure 17:
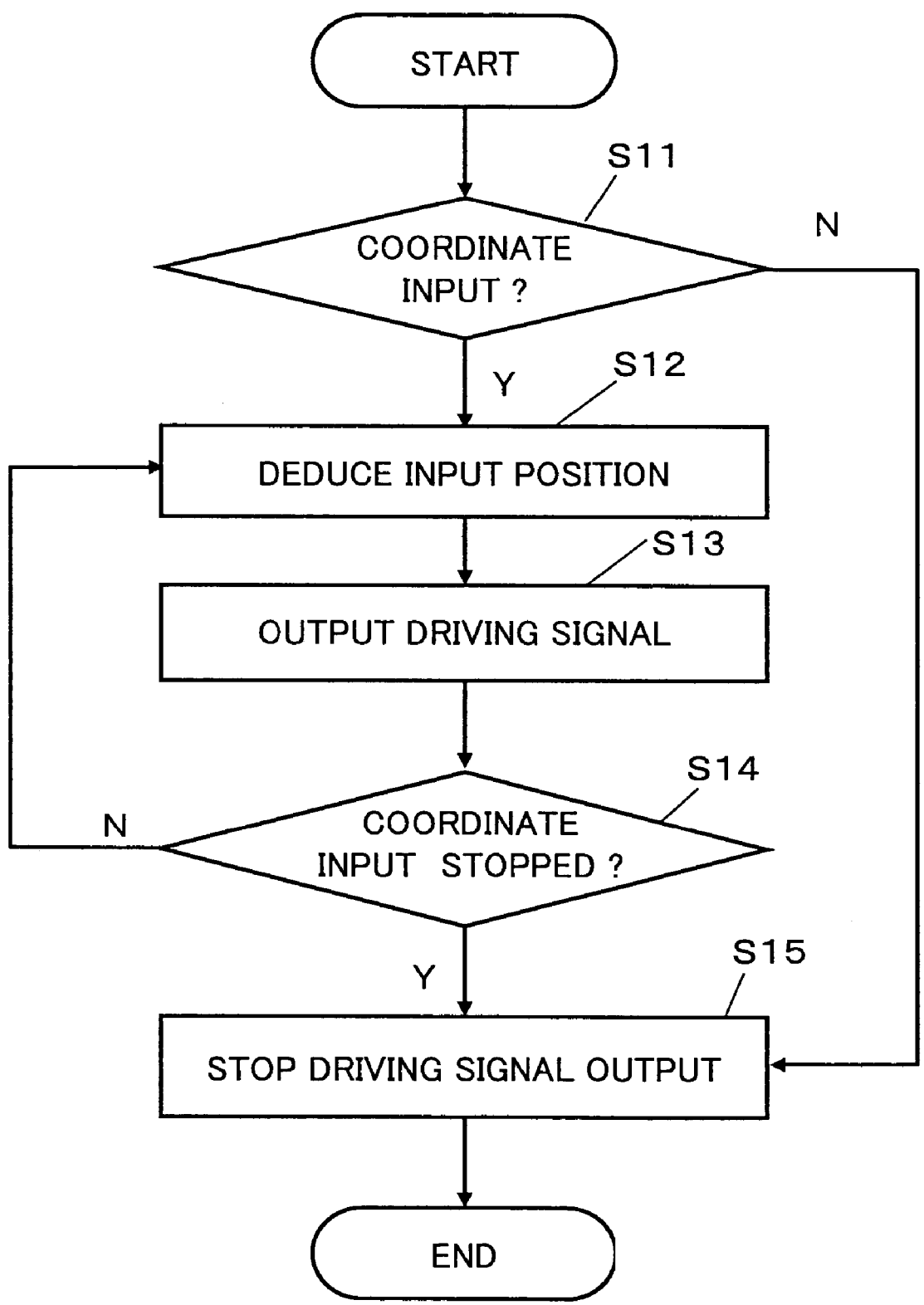
FIG. 17 is a flowchart showing the operations of the processing unit 113 according to the second embodiment.

FIG. 17 is a flowchart showing the operations of the processing unit 113 according to the second embodiment.

In step S11, the processing unit 113 determines whether coordinate information is input from the detection unit 112. If the coordinate information is input, the routine proceeds to step S12, otherwise, to step S15.

In step S12, from the coordinate information input from the detection unit 112, the processing unit 113 deduces the position for inputting coordinates.

In step S13, the processing unit 113 generates a driving signal at a frequency corresponding to the deduced coordinate inputting position, and outputs the signal from the output port Pout.

In step S14, the processing unit 113 determines whether coordinate information input from the detection unit 112 is stopped. If it is stopped, the routine proceeds to step S12 and deduces new coordinate inputting position, otherwise, to step S15.

In step S15, the processing unit 113 stops outputting the driving signal from the output port Pout.

Due to the above operations, when the touch panel 123 is pressed, the touch panel 123 can be vibrated. Further, because the vibrating frequency changes corresponding to the position where the coordinates are input, the input position is recognizable by feeling.

In the first and second embodiment, it is described that the vibrating motion of the vibration section 122 is controlled according to the output signal from the touch panel 123, but the present invention is not limited to this. For example, the vibration of the vibration section 122 may also be controlled by detecting the electromotive force induced on the conductive wire 151 of the current conducting element 132 constituting part of the vibration section 122, and detecting the operations on the touch panel 123.

Third Embodiment

Figure 18:
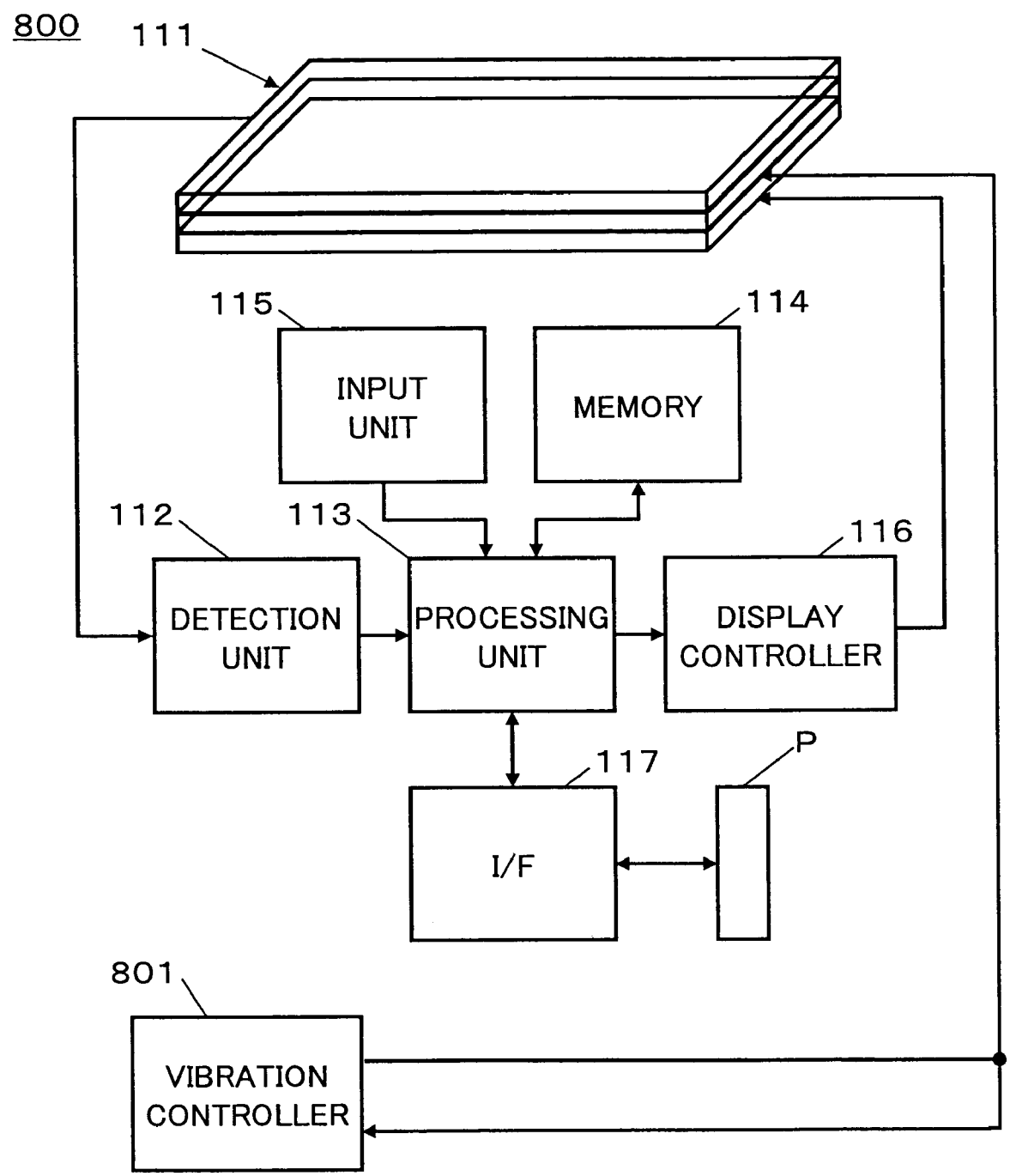
FIG. 18 is a block view showing a configuration of an information processing system according to a third embodiment of the present invention.

FIG. 18 is a block view showing a configuration of an information processing system 800 according to a third embodiment of the present invention. Here, the same reference numbers are used for the same elements as in FIG. 2, and the overlapping descriptions are omitted.

In the information processing system 800, the configuration of the vibration controller 801 is different from the vibration controller 116 in FIG. 2.

In the vibration section 122, the distance between the current conducting element 132 and the magnets 131a through 131d changes when the touch panel 123 is pressed, and an electromotive force is induced on the conductive wire 151 of the current conducting element 132 according to the Fleming's right-hand rule. In the present embodiment, the induced electromotive force induced on the conductive wire 151 is detected to control the vibrating motion.

Figure 19:
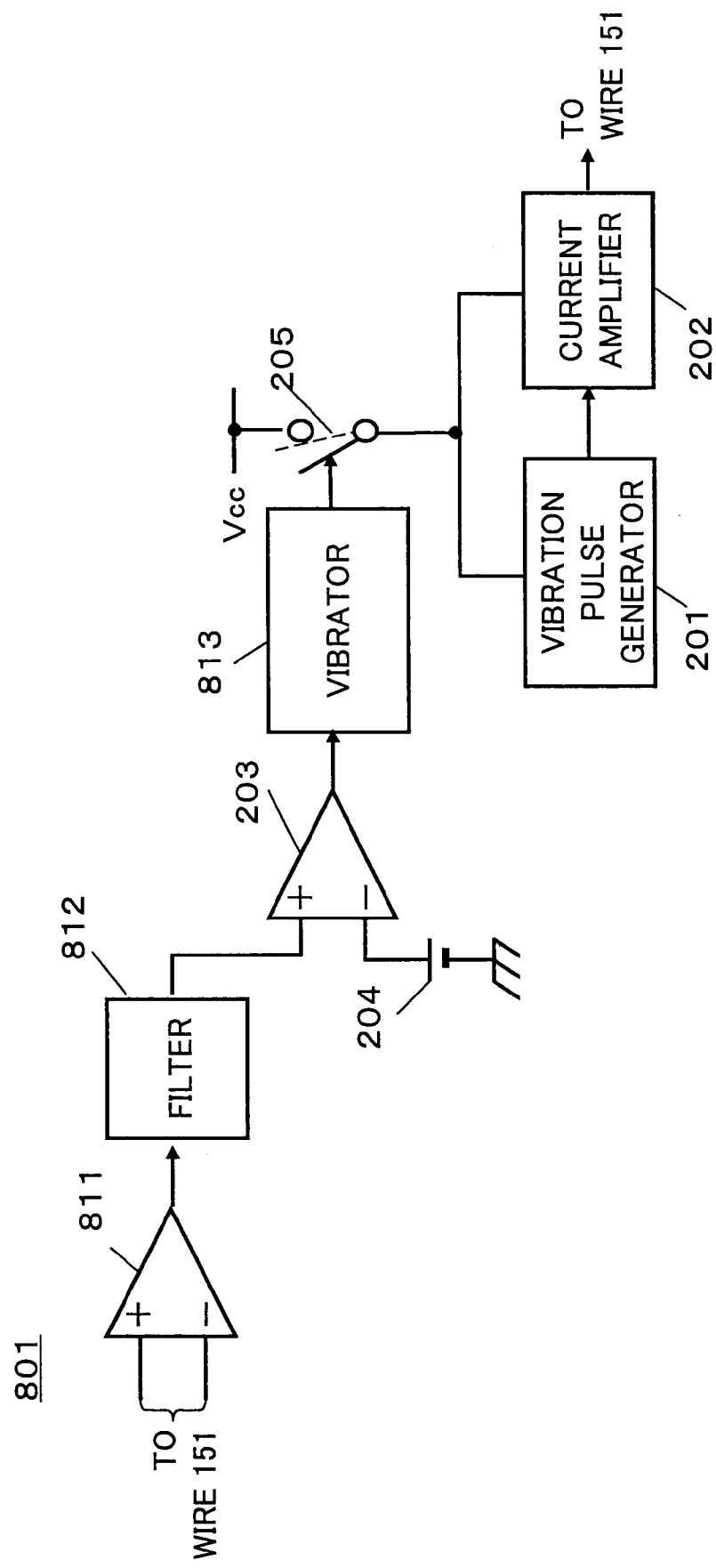
FIG. 19 is a block view showing a configuration of the vibration controller 801.

FIG. 19 is a block view showing a configuration of the vibration controller 801. Here, the same reference numbers are used for the same elements as in FIG. 9, and the overlapping descriptions are omitted.

The vibration controller 801 includes an amplifier 811, a filter 812, and a one-shot multivibrator 813 in addition to the elements in the vibration controller 118 in FIG. 9.

The amplifier 811 is connected to the conductive wire 151; it amplifies the voltage signal on the conductive wire 151 and outputs the signal. The output of the amplifier 811 is sent to the filter 812. The filter 812 has a characteristic of allowing the frequency components corresponding to the electromotive force induced when the touch panel 123 is pressed by an operator, rejecting other frequency components of the voltage signals on the conductive wire 151 so as to reject the frequency components corresponding to the driving signal.

The output of the filter 812 is input to the non-inverted input terminal of the comparator 203. The comparator 203 compares the reference voltage with the output of the filter 812, and outputs a signal at a high level when the voltage of the output of the filter 812 is higher than the reference voltage, and outputs a signal at a low level when the voltage of the output of the filter 812 is lower than the reference voltage.

The output of the comparator 203 is input to the one-shot multivibrator 813. When the output signal of the comparator 203 is rising, the one-shot multivibrator 813 outputs a high level signal having a preset time width relative to the rising time of the output signal of the comparator 203.

The output of the one-shot multivibrator 813 is input to the switch 205.

The switch 205 is turned on when the output of the one-shot multivibrator 813 is at the high level, and therefore, a signal for driving the vibration pulse generator 201 and the current amplifier 202 is fed to the conductive wire 151 of the current conducting element 132 constituting the vibration section 122. The touch panel 123 is thereby operated, and an electromotive force is induced at the two ends of the conductive wire 151. This electromotive force is detected, and the touch panel 123 then vibrates for a preset time period.

According to the present embodiment, since the detection and the vibration operations are completed at the vibration section 122, it is easy to install the vibration section 122 at various places, particularly, the vibration section 122 can be installed regardless of the operational principle of the touch panel 123.

Fourth Embodiment

In the third embodiment, the vibration section vibrates at frequencies easily perceived by operators, for example, in the range from 10 to 100 Hz.

In addition to merely making the vibration section vibrate, the vibrating motion of the vibration section may further cause the display section and the touch panel to vibrate at the audible frequency range and thus to sound or output music.

The present embodiment is related to a configuration in which, due to the vibrating motion of the vibration section, the display section and the touch panel vibrate at the audible frequency range and sound and/or output music.

The information processing system according to the present embodiment has basically the same configuration as that of the information processing system according to the second embodiment as shown in FIG. 16; the difference is in the operations of the processing unit 113 and in the aspect that sound data, such as music data, are stored in the memory 114 in the present embodiment and these data are output in response to vibration of the vibration section 122. In the following, description of the configuration of the system is omitted.

Figure 20:
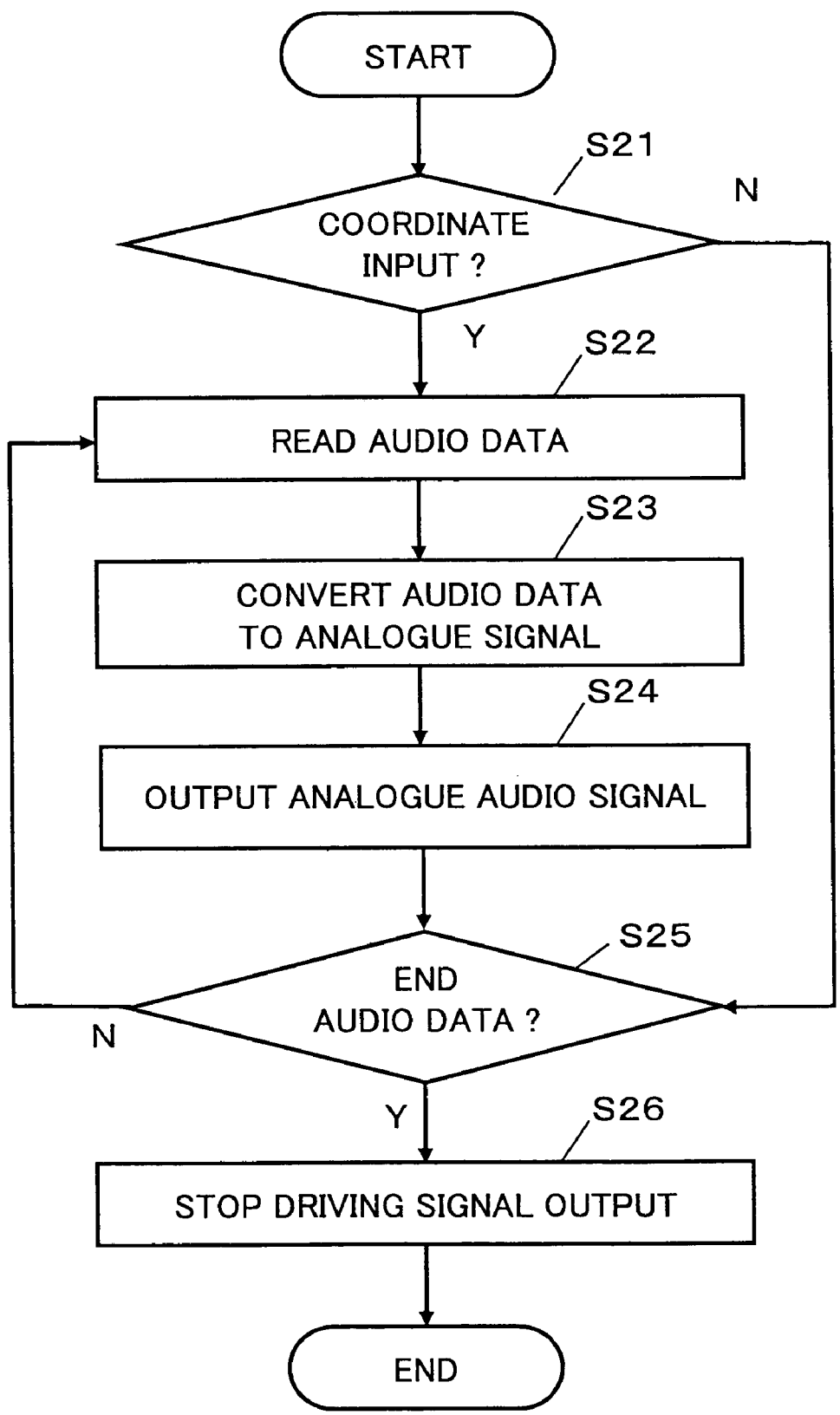
FIG. 20 is a flowchart showing the operations of the processing unit 113 for outputting audio signals according to a fourth embodiment of the present invention.

FIG. 20 is a flowchart showing the operations of the processing unit 113 for outputting audio signals according to the fourth embodiment of the present invention.

In step S21, the processing unit 113 determines whether coordinate information is input from the detection unit 112.

If coordinate information is input, the routine proceeds to step S22, otherwise, to step S25.

In step S22, the processing unit 113 reads out the sound data selected in advance from the memory 114.

In step S23, the processing unit 113 converts the sound data read out from the memory 114 into analogue audio signals.

In step S24, the processing unit 113 outputs the analogue audio signals from the output port Pout.

The analogue audio signals output from the output port Pout are sent to the current amplifier 701. The current amplifier 701 outputs driving currents corresponding to the analogue audio signals to the vibration section 122. The vibration section 122 makes the touch panel vibrate in response to the analogue audio signals. Because of the vibration of the touch panel 123 according to the analogue audio signals, the screen 11 outputs music or sounds.

In step S25, the processing unit 113 determines whether output of the sound data should be ended. If it should ended, the routine proceeds to step S26, otherwise, to step S22 to read out new data.

In step S26, the processing unit 113 stops outputting the driving signal from the output port Pout.

Fifth Embodiment

In the third, the second and the third embodiments, the driving device of the present invention is applied to a PDA. In the present embodiment, explanations are made of a case in which the driving device of the present invention is applied to the screen of the display of a cellular phone.

Figure 21:
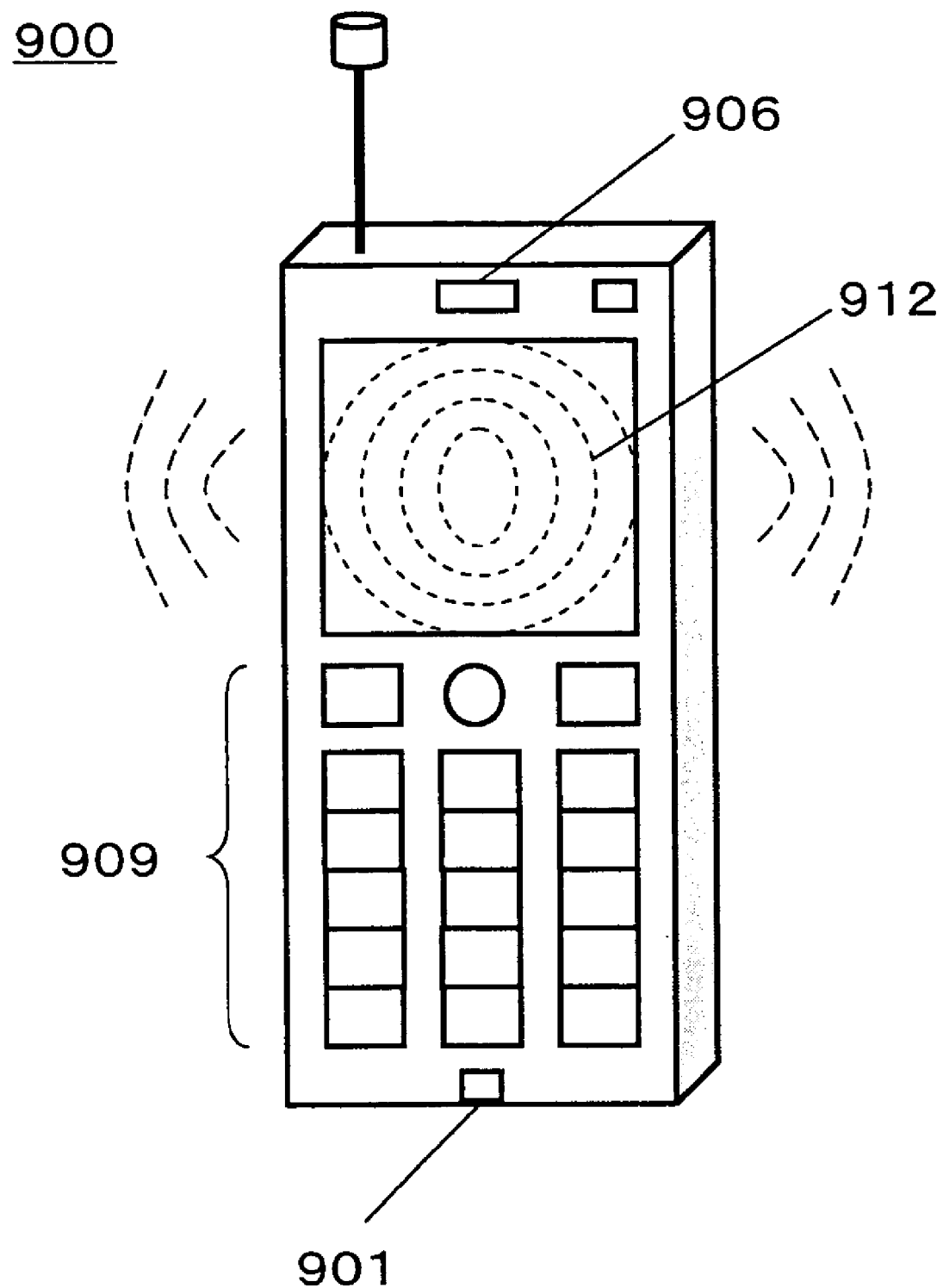
FIG. 21 is an exploded perspective view of a fifth embodiment of a cellular phone according to the present invention.
Figure 22:
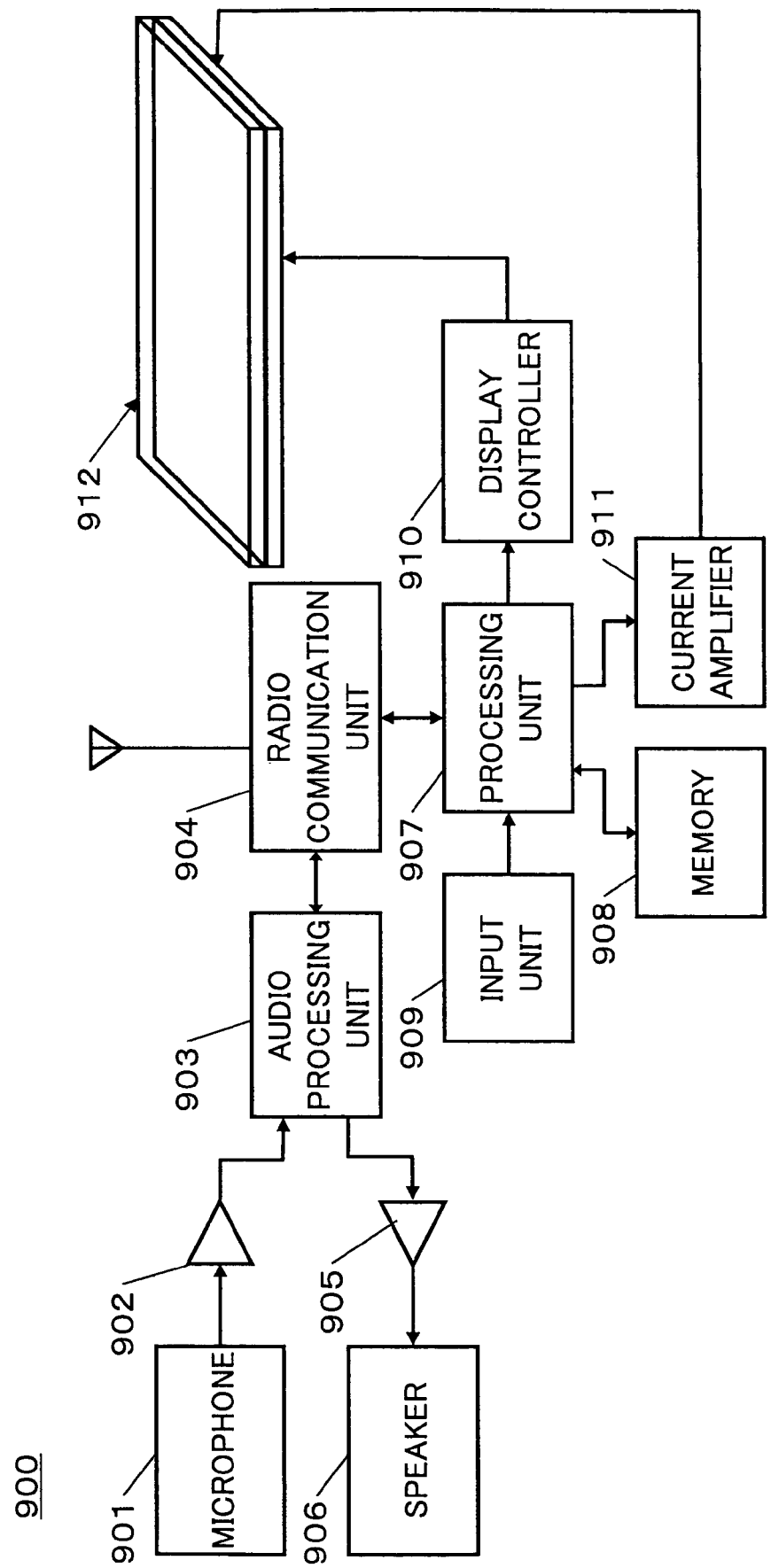
FIG. 22 is a block view showing a configuration of the cellular phone according to the fifth embodiment.

FIG. 21 is an exploded perspective view of the fifth embodiment of a cellular phone 900 according to the present invention; FIG. 22 is a block view showing a configuration of the cellular phone 900 according to the fifth embodiment.

Referring to FIGS. 21 and 22, the cellular phone 900 includes a microphone 901, an amplifier 902, an audio processing unit 903, a radio communication unit 904, an amplifier 905, a speaker 906, a processing unit 907, a memory 908, an input unit 909, a display controller 910, a current amplifier 911, and a panel unit 912.

The microphone 901 converts voice into electronic signals, and sends the audio signals to the amplifier 902. The amplifier 902 amplifies the audio signals from the microphone 901, and outputs the audio signals to the audio processing unit 903. The audio processing unit 903 converts the audio signals from the amplifier 902 into digital signals, and outputs the digital audio signals to the radio communication unit 904. The radio communication unit 904 transmits the audio codes from the audio processing unit 903 by radio. The transmitted audio codes are transmitted to a destination cellular phone through a network, and corresponding voice is output from the destination cellular phone.

The voice from the destination cellular phone is converted into codes, and the codes are transmitted to the cellular phone 900 by radio. The radio communication unit 904 receives the audio codes, and sends the audio codes to the audio processing unit 903. The audio processing unit 903 decodes the audio codes to reconstruct the voice. The audio signal is amplified by the amplifier 905 and is output from the speaker 906.

The processing unit 907 operates under the instructions of programs stored in the memory 908. The processing unit 907 dials according to commands or data input from the input unit 909 to establish the communication link with the destination cellular phone, enabling a phone call with the destination cellular phone. In addition, the processing unit 907 controls the display controller 910 to display texts or images on the panel unit 912. For example, the processing unit 907 performs communications through the radio communication unit 904, and enables sending or receiving electronic mails or display of a web page. Further, when a phone call or an electronic mail arrives, the processing unit 907 outputs oscillation signals in a frequency range from 10 Hz to 100 Hz to the current amplifier 911 in a predetermined pattern. The current amplifier 911 amplifies the oscillation signals from the processing unit 907 and outputs the signals to the panel unit 912.

Figure 23:
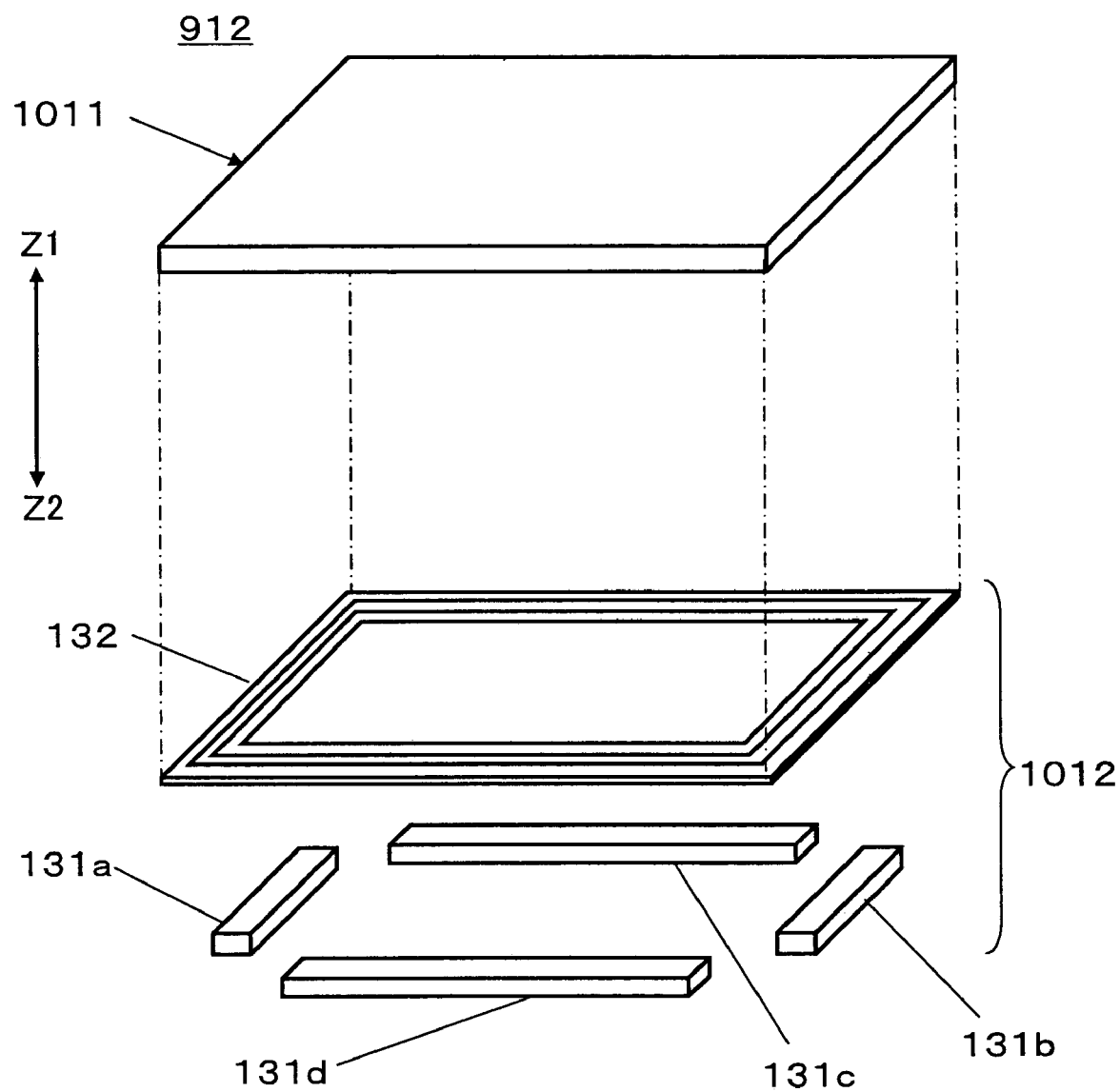
FIG. 23 is an exploded perspective view of the panel 912.

FIG. 23 is an exploded perspective view of the panel 912. Here, the same reference numbers are used for the same elements as in FIG. 3, and the overlapping descriptions are omitted.

As shown in FIG. 23, the panel unit 912 includes a vibration section 1012. The vibration section 1012 is arranged below the display section 1011, and makes the display section 1011 vibrate in the Z1 and Z2 directions according to the driving current from the current amplifier 911. The vibration section 1012 acts as a vibrator and makes the display section 1011 vibrate in a frequency range from 10 Hz to 100 Hz.

Figure 24:
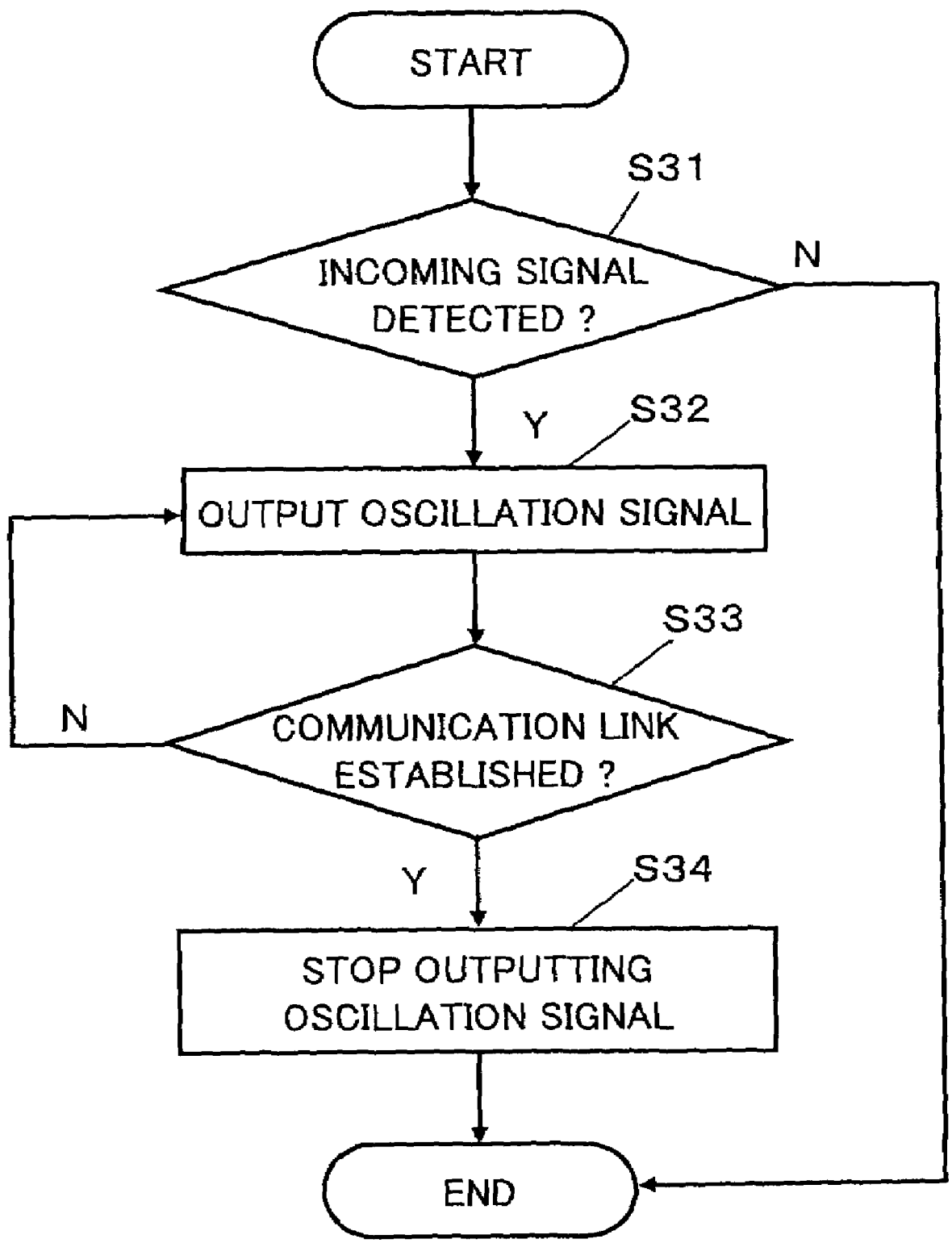
FIG. 24 is a flowchart showing the operations of the processing unit 907 when signals are received.

FIG. 24 is a flowchart showing the operations of the processing unit 907 when signals are received.

In step S31, the processing unit 907 detects arrival of signals, such as a phone call or an electronic mail, based on the notification from the radio communication unit 904. If the processing unit 907 detects arrival of signals, the routine proceeds to step S32, otherwise, to the end of the process.

In step S32, the processing unit 907 sends the oscillation signals to the current amplifier 911. The current amplifier 911 amplifies the oscillation signals and outputs a driving current to the vibration section 1012 according to the oscillation signals. The vibration section 1012 makes the display section 1011 vibrate according to the driving current from the current amplifier 911. Due to the vibration of the display section 1011, the cellular phone 900 vibrates and acts as a vibrator.

In step S33, the processing unit 907 determines whether a communication link is established, or whether output of the oscillation signals having the predetermined pattern is stopped. If a communication link is established, or output of the oscillation signals having the predetermined pattern is stopped, the routine proceeds to step S34, otherwise, to step S32 to continue output of the driving current.

In step S34, the processing unit 907 stops output of the oscillation signals to the current amplifier 911.

According to the above embodiment, the vibration section 1012 can be used as a vibrator in a conventional cellular phone. Since the vibration section 1012 can be made thin, it is possible to make the cellular phone 900 thin and light by incorporating therein the vibration section 1012 of the present embodiment instead of a conventional motor-type vibrator. Further, since the vibration section 1012 has the function of a speaker, it is possible to make the vibration section 1012 act as a speaker instead of using the speaker 906, which is for phone calls. Further, since the vibration section 1012 has the function of a microphone, it is possible to make the vibration section 1012 to act as a microphone instead of using the microphone 901, which is for phone calls.

As described above, since the vibration section 1012 has all of the functions of a vibrator, a speaker, and a microphone, it is possible to make the cellular phone 900 thin, compact and light by incorporating the vibration section 1012 instead of using a vibrator, a speaker, and a microphone separately. In addition, in the present embodiment, the configuration of the panel unit 912 may be made the same as that in the first embodiment, and the input operations may be performed using the touch panel 123, and the touch panel 123 may be vibrated. Further, numerous modifications may be made to the arrangement of the vibration section 1012 and the method of driving the vibration section 1012, as done in the first, second and third embodiments.

Sixth Embodiment

In the fifth embodiment, the driving device of the present invention is applied to the screen of the display of a cellular phone. In the present embodiment, explanations are made of a case in which the driving device of the present invention is applied to the touch panel of a personal computer.

Figure 25:
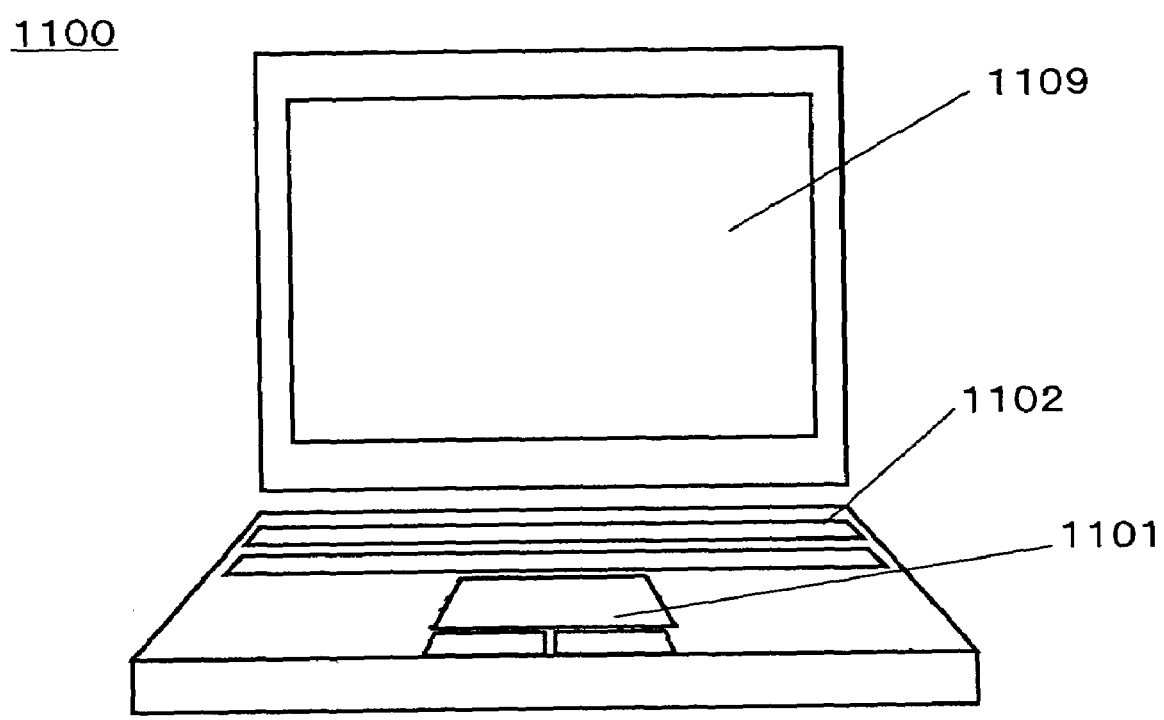
FIG. 25 is an exploded perspective view of a personal computer according to a sixth embodiment of the present invention.
Figure 26:
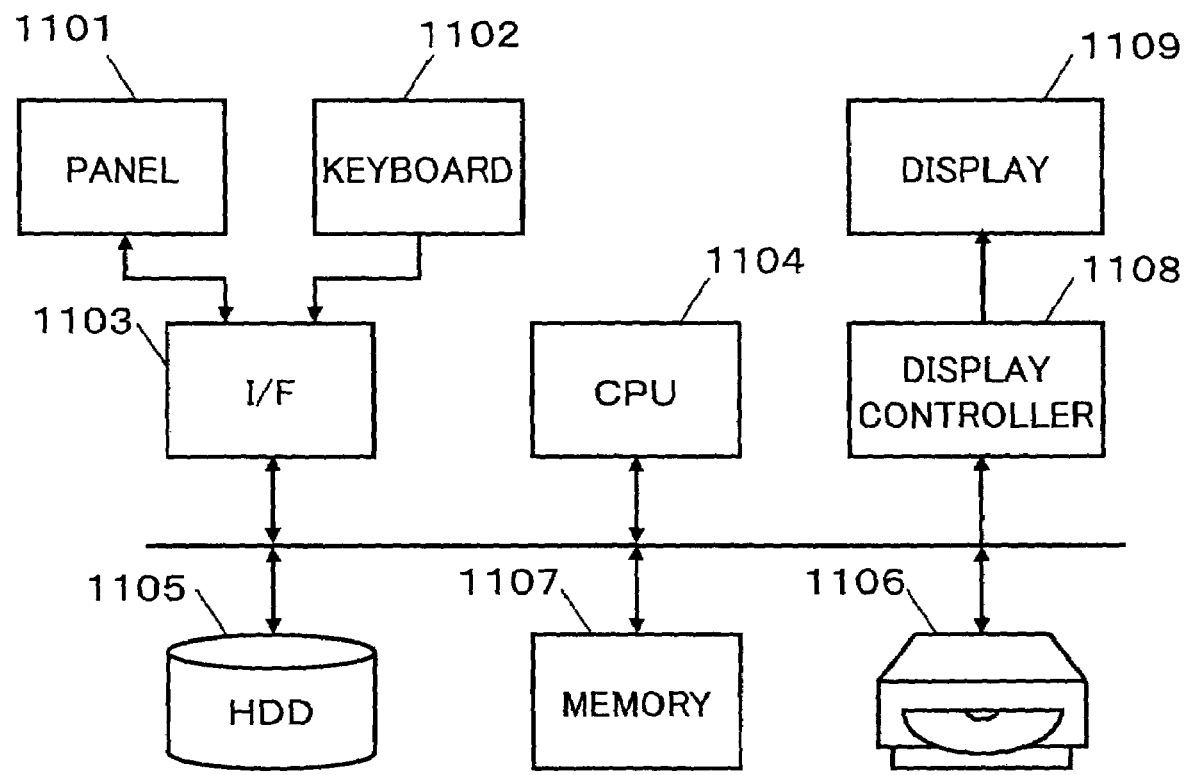
FIG. 26 is a block view showing a configuration of the personal computer according to the sixth embodiment.

FIG. 25 is an exploded perspective view of a personal computer according to the sixth embodiment of the present invention. FIG. 26 is a block view showing a configuration of the personal computer according to the sixth embodiment.

As shown in FIG. 25 and FIG. 26, the personal computer 1100 according to the present embodiment is a portable personal computer, and includes an input panel unit 1101, a keyboard 1102, an interface 1103, a CPU 1104, a hard disk drive 1105, an exchangeable memory 1106, a memory 1107, a display controller 1108, and a display screen 1109.

The input panel unit 1101 is a device for inputting coordinates by finger operations, and vibrates in response to inputting operations.

Figure 27:
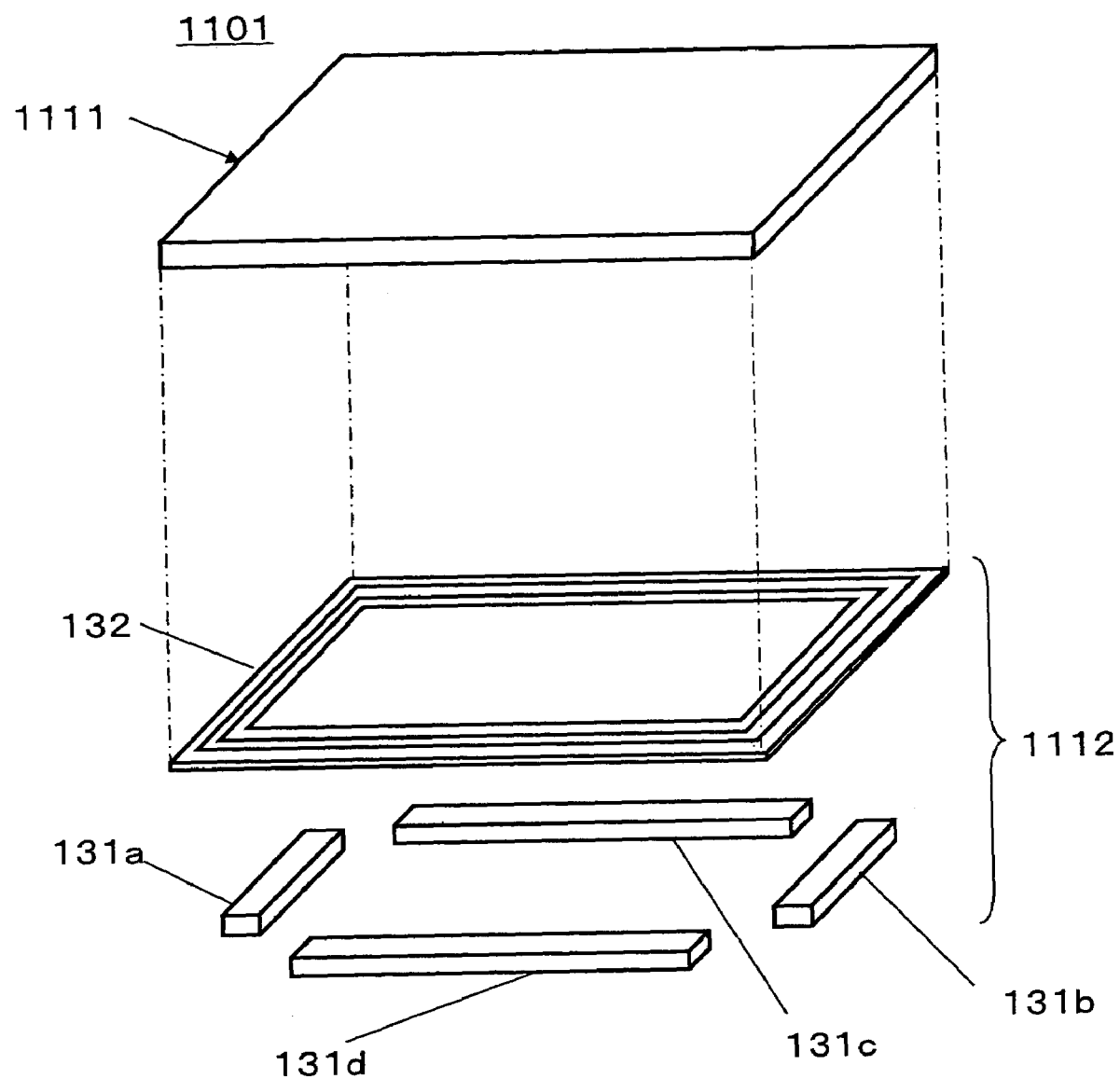
FIG. 27 is an exploded perspective view of the input panel unit 1101.

FIG. 27 is an exploded perspective view of the input panel unit 1101. Here, the same reference numbers are used for the same elements as in FIG. 3, and the overlapping descriptions are omitted.

The input panel unit 1101 shown in FIG. 27 includes a vibration section 1112 under the touch pad 1111. The touch pad 1111 detects the movement of a finger on it and inputs the coordinates of a cursor or a pointer by charge inducing or static electric means.

The vibration section 1112 has the same configuration as those described in the first through fourth embodiments, that is, the vibration section 1112 operates according to a driving current supplied by the interface 1103. The vibration section 1112 makes the touch pad 111 vibrate at a preset frequency, corresponding to given sound data. The keyboard 1102 is for data input by typing keys. The input panel unit 1101 sends the input data to the CPU 1104 through the interface 1103. The CPU 1104 executes commands according to the data input through the input panel unit 1101 and the keyboard 1102. The exchangeable memory 1106 may be a floppy disk drive, a CD-ROM drive, or a DVD-ROM drive; it writes data onto or reads data from an exchangeable storage medium thereof.

The memory 107 is a storage area used by the CPU 1104 while it is in operation. When the CPU 1104 executes a program installed in the hard disk drive 1105 or the exchangeable storage medium of the exchangeable memory 1106, the CPU 1104 reads the program from the hard disk drive 1105 or the exchangeable memory 1106, and stores the program into the memory 107. In addition, the CPU 1104 stores temporary data in the memory 107 while executing the program.

The display controller 1108 displays images on the screen 1109 based on image data supplied by the CPU 1104.

According to the present embodiment, because the touch pad 111 vibrates according to the inputting operations, it is possible to improve the operationality.

While the invention has been described with reference to specific embodiments chosen for purpose of illustration, it should be apparent that the invention is not limited to these embodiments, but numerous modifications could be made thereto by those skilled in the art without departing from the basic concept and scope of the invention.

In the above embodiments, it was described that the present invention is applied to a PDA, a cellular phone, and a personal computer, but the present invention is not limited to these apparatuses; it is applicable to various other kinds of apparatuses.

Summarizing the effect of the invention, according to the present invention, a current conducting element is arranged in the region corresponding to the peripheral region of the input panel to conduct a driving current, and a magnetic field application unit is arranged in the region corresponding to the peripheral region of the input panel. When the driving current conducts in the current conducting element, the magnetic field application unit applies a magnetic field on the current conducting element, and the magnetic field is in parallel to the input panel and intersects the current conducting element. Therefore, according to Fleming's left-hand rule, a force is imposed on the current conducting element and the magnetic field application unit, making the current conducting element or the magnetic field application unit displace. This displacement further drives the input panel to vibrate. Consequently, the input operation can be recognized by feeling the vibration of the input panel, and good operationality may be obtained.

In addition, because it is sufficient to apply a magnetic field parallel to the input panel, and locate the current conducting element within the magnetic field, the configuration of the input device is simple, and the input device can be made thin. Further, because a magnetic field is used to generate the vibration motion, the amplitude of the vibration is large.

In addition, in the input device of the present invention, because the current conducting element and the magnetic field application unit are arranged in the region corresponding to the peripheral region of the input panel, the center portion of the input panel is open. Therefore, when the input device is applied to a touch panel that serves as a display screen, image display on the touch panel is not hampered.

This patent application is based on Japanese priority patent application No. 2003-063844 filed on Mar. 10, 2003, the entire contents of which are hereby incorporated by reference.

What is claimed is:

1. An input device, comprising:
    an input panel inputting data when being touched;
    a current conducting element conducting a driving current when the input panel is touched, said current conducting element being arranged in a region corresponding to a peripheral region of the input panel; and
    a magnetic field application unit configured to apply a magnetic field to the current conducting element, the magnetic field application unit being arranged in the region corresponding to the peripheral region of the input panel, wherein the magnetic field intersects the current conducting element, and a portion of the magnetic field that intersects the current conducting element is parallel to the input panel.

2. The input device as claimed in claim 1, wherein:
    the current conducting element is a rectangular coil and is fixed in the region corresponding to the peripheral region of the input panel; and the magnetic field application unit is arranged to face the current conducting element.

3. The input device as claimed in claim 1, wherein the current conducting element is a printed pattern formed on the input panel.

4. The input device as claimed in claim 1, wherein:
the magnetic field application unit is fixed in the region corresponding to the peripheral region of the input panel; and
the current conducting element is arranged to face the magnetic field application unit.

5. The input device as claimed in claim 1, further comprising:
a contact detection unit detecting contact on the input panel; and
a driving unit supplying the driving current to the current conducting element when the contact detection unit detects contact on the input panel.

6. The input device as claimed in claim 5, wherein the driving current has a predetermined frequency.

7. The input device as claimed in claim 6, wherein the driving current has a frequency in an audible frequency range.

8. The input device as claimed in claim 5, wherein the frequency of the driving current is changeable according to a position of the contact on the input panel.

9. The input device as claimed in claim 5, wherein:
the contact detection unit detects an electromotive force induced on the current conducting element.

10. The input device as claimed in claim 1, wherein the input panel is swingable relative to a predetermined center.

11. The input device as claimed in claim 1, wherein:
the magnetic field application unit includes:
a first permanent magnet; and
a second permanent magnet, wherein:
magnetic poles of the first permanent magnet are arranged to be opposite to respective magnetic poles of the second permanent magnet; and
a direction along the magnetic poles of each of the first permanent magnet and the second permanent magnet is perpendicular to a plane formed by the magnetic field intersecting the current conducting element.

12. A vibrating device, comprising:
a panel section;
a current conducting element conducting a driving current to drive the panel section to vibrate, said current conducting element being arranged in a region corresponding to a peripheral region of the panel section; and
a magnetic field application unit configured to apply a magnetic field to the current conducting element, the magnetic field application unit being arranged in the region corresponding to the peripheral region of the panel section, wherein the magnetic field intersects the current conducting element, and a portion of the magnetic field that intersects the current conducting element is parallel to the panel section.

13. A driving device driving a panel to vibrate, comprising:
a current conducting element conducting a driving current, said current conducting element being arranged in a region corresponding to a peripheral region of the panel; and
a magnetic field application unit configured to apply a magnetic field to the current conducting element, the magnetic field application unit being arranged in the region corresponding to the peripheral region of the panel, the magnetic field intersecting the current conducting element, and a portion of the magnetic field that intersects the current conducting element being parallel to the panel.

14. The driving device as claimed in claim 13, wherein:
the current conducting element is a rectangular coil and is fixed in the region corresponding to the peripheral region of the panel; and
the magnetic field application unit is arranged to face the current conducting element.

15. The driving device as claimed in claim 13, wherein the current conducting element is a printed pattern formed on the panel.

16. The driving device as claimed in claim 13, wherein:
the magnetic field application unit is fixed in the region corresponding to the peripheral region of the panel; and
the current conducting element is arranged to face the magnetic field application unit.

17. The driving device as claimed in claim 13, further comprising:
a contact detection unit detecting contact on the panel; and
a driving unit supplying the driving current to the current conducting element when the contact detection unit detects contact on the panel.

18. The driving device as claimed in claim 17, wherein the driving current has a predetermined frequency.

19. The driving device as claimed in claim 18, wherein the driving current has a frequency in an audible frequency range.

20. The driving device as claimed in claim 17, wherein the frequency of the driving current is changeable according to a position of the contact on the panel.

21. The driving device as claimed in claim 17, wherein:
the contact detection unit detects an electromotive force induced on the current conducting element.

22. The driving device as claimed in claim 13, wherein the panel is swingable relative to a predetermined center.

23. The driving device as claimed in claim 13, wherein:
the magnetic field application unit includes:
a first permanent magnet; and
a second permanent magnet, wherein
magnetic poles of the first permanent magnet are arranged to be opposite to respective magnetic poles of the second permanent magnet; and
a direction along the magnetic poles of each of the first permanent magnet and the second permanent magnet is perpendicular to a plane formed by the magnetic field intersecting the current conducting element.

24. A display screen, comprising:
a display section displaying images;
a touch panel to input data; and
a vibrating section between the display section and the touch panel, the vibrating section comprising:
a current conducting element conducting current when the touch panel is touched; and
a magnetic field applicator applying a magnetic field to the current conducting element causing the vibrating section and touch panel to vibrate when the current conducting element is conducting current.

25. The display screen as claimed in claim 24, wherein the magnetic field intersects the current conducting element, and a portion of the magnetic field that intersects the current conducting element is parallel to the display screen.

* * * * *